US008064401B2

(12) United States Patent
Anigstein et al.

(10) Patent No.: US 8,064,401 B2
(45) Date of Patent: Nov. 22, 2011

(54) EXPEDITED HANDOFF

(75) Inventors: Pablo Anigstein, Gillette, NJ (US);
Junyi Li, Bedminster, NJ (US); Murari Srinivasan, Palo Alto, CA (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 986 days.

(21) Appl. No.: 11/486,712

(22) Filed: Jul. 14, 2006

(65) Prior Publication Data
US 2008/0013489 A1  Jan. 17, 2008

(51) Int. Cl.
*H04W 4/00* (2009.01)
(52) U.S. Cl. ........ 370/331; 370/342; 370/328; 370/332; 370/330; 455/436; 455/439; 455/447; 455/448; 455/561
(58) Field of Classification Search .......... 455/436, 455/439, 562, 448, 450, 561, 452, 447; 370/331, 370/395, 342, 328, 332, 330; 342/357
See application file for complete search history.

(56) References Cited

U.S. PATENT DOCUMENTS

| | | | |
|---|---|---|---|
| 6,188,904 B1 * | 2/2001 | Marsan | 455/450 |
| 6,246,872 B1 * | 6/2001 | Lee et al. | 455/414.1 |
| 6,768,908 B1 * | 7/2004 | Jalloul et al. | 455/442 |
| 6,889,045 B2 * | 5/2005 | Pan et al. | 455/436 |
| 7,212,821 B2 | 5/2007 | Laroia et al. | |
| 2002/0028690 A1 * | 3/2002 | McKenna et al. | 455/517 |
| 2002/0126706 A1 * | 9/2002 | Laroia et al. | 370/503 |
| 2003/0040306 A1 * | 2/2003 | Kentaro et al. | 455/422 |
| 2004/0001460 A1 * | 1/2004 | Bevan et al. | 370/331 |
| 2004/0077356 A1 * | 4/2004 | Krenik et al. | 455/450 |
| 2005/0089007 A1 * | 4/2005 | Semper | 370/349 |
| 2005/0124344 A1 * | 6/2005 | Laroia et al. | 455/436 |
| 2005/0124345 A1 * | 6/2005 | Laroia et al. | 455/437 |
| 2005/0192011 A1 * | 9/2005 | Hong et al. | 455/440 |
| 2005/0286466 A1 * | 12/2005 | Tagg et al. | 370/329 |
| 2008/0076432 A1 * | 3/2008 | Senarath et al. | 455/442 |

FOREIGN PATENT DOCUMENTS
WO   03077483   9/2003
WO   2005062633   7/2005

OTHER PUBLICATIONS

International Search Report, PCT/US07/073550, International Search Authority, European Patent Office, Mar. 27, 2008.
Written Opinion, PCT/US07/073550, International Search Authority, European Patent Office, Mar. 27, 2008.

* cited by examiner

*Primary Examiner* — Nick Corsaro
*Assistant Examiner* — Mahendra Patel
(74) *Attorney, Agent, or Firm* — Kam T. Tam

(57) ABSTRACT

Systems and methodologies are described that facilitate handing off from a first sector to a second sector. An established link to the first sector may be employed to communicate with the second sector. A handoff request from a wireless terminal to the second sector and an associated handoff response from the second sector to the wireless terminal may both traverse the first sector.

42 Claims, 17 Drawing Sheets

EXPEDITED HANDOFF

BACKGROUND

I. Field

The following description relates generally to wireless communications, and more particularly to handoff between access points or base stations in wireless communications.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Handoffs between base stations and/or base station sectors commonly occur within wireless communication systems. For instance, handoffs may be mobile-directed such that upon detecting a signal with a signal quality (e.g., signal to noise ratio (SNR)) above a threshold from a disparate sector differing from a sector to which the wireless terminal is currently connected, the wireless terminal may attempt to access the disparate sector. Oftentimes, make before break handoffs may be utilized such that a link to the current sector may be broken prior to accessing the disparate, detected sector. Further, access to a sector may be contention-based where two or more wireless terminals may transmit access requests to the sector at a substantially similar time over a shared resource (e.g., channel); thus, by employing contention-based techniques, handoffs within typical wireless communication systems may encounter significant time delays. Moreover, wireless terminals that perform conventional handoffs within a multicarrier setting where different sectors may be associated with disparate carriers may probe for other sectors and/or carriers for handing off to by way of retuning, which may cause loss of a current connection.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating handing off from a first sector to a second sector. An established link to the first sector may be employed to communicate with the second sector. A handoff request from a wireless terminal to the second sector and an associated handoff response from the second sector to the wireless terminal may both traverse the first sector.

According to related aspects, a method of handing off from a first sector to a second sector is described herein. The method may comprise detecting a signal emanating from the second sector. The method may also include sending a handoff request to the second sector via a first link with the first sector. Further, the method may include receiving a handoff response from the second sector through the first link and the first sector, wherein the handoff response includes identified information. Moreover, the method may comprise establishing a second link with the second sector utilizing the identified information.

Another aspect relates to a wireless communications apparatus that may include a memory that retains instructions for handing off from a first sector to a second sector. Further, a processor may detect a signal associated with a second sector, transmit a handoff request to the second sector via a first link with the first sector, receive a handoff response from the second sector via the first link and the first sector, and create a second link with the second sector based upon identified information included in the handoff response.

Yet another aspect relates to a wireless communications apparatus for mitigating delay associated with handing off from a first sector to a second sector. The wireless apparatus may include means for detecting a signal emanating from the second sector; means for transmitting a handoff request to the second sector via a first link with the first sector; means for receiving a handoff response from the second sector through the first link and the first sector; and means for establishing a second link with the second sector.

Still another aspect relates to a machine-readable medium having stored thereon machine-executable instructions for receiving a beacon associated with a second sector and transmitting a handoff request to the second sector routed through a first link with a first sector. Further, the machine-readable medium may have stored thereon machine-executable instructions for obtaining a handoff response from the second sector routed through the first link and the first sector, wherein the handoff response includes identified information. Moreover, the machine-readable medium may have stored thereon machine-executable instructions for creating a second link with the second sector by utilizing the identified information.

In accordance with another aspect, a processor is described herein, wherein the processor may execute instructions for detecting a signal related to a second sector. Further, the processor may execute instructions for sending an expedited handoff request to the second sector via a first link with a first sector. The processor may additionally execute instructions for receiving a handoff response that includes identified information from the second sector via the first link and the first sector. Moreover, the processor may execute instructions for establishing a second link with the second sector utilizing the identified information.

According to other aspects, a method that facilitates allocating resources to a wireless terminal to mitigate handoff delay is described herein. The method may include receiving a handoff request from a wireless terminal via a disparate sector. Also, the method may include allocating resources to the wireless terminal. The method may further comprise transmitting a handoff response that includes identified information related to the allocated resources. Moreover, the method may include establishing a link with the wireless terminal by employing the allocated resources.

Yet another aspect relates to a wireless communications apparatus that may include a memory that retains an identifier related to a wireless terminal. Further, a processor may receive a handoff request from the wireless terminal, incorporate the identifier related to the wireless terminal in the handoff request, route the handoff request to a disparate sector, receive a handoff response from the disparate sector, and forward the handoff response to the wireless terminal.

Another aspect relates to a wireless communications apparatus for allocating resources to a wireless terminal for utilization in connection with a handoff. The wireless communications apparatus may include means for obtaining a handoff request from a wireless terminal through a disparate sector; means for allocating resources to the wireless terminal; means for sending identified information associated with the allocated resources in a handoff response to the wireless terminal via the disparate sector; and means for establishing a link with the wireless terminal utilizing the allocated resources.

Still another aspect relates to a machine-readable medium having stored thereon machine-executable instructions for receiving a handoff request in response to a beacon from a wireless terminal via a disparate sector, allocating resources to the wireless terminal, transmitting identified information associated with the resources in a handoff response to the wireless terminal through the disparate sector, and creating a link with the wireless terminal employing the resources.

In accordance with another aspect, a processor is described herein, wherein the processor may execute instructions for receiving a handoff request for a disparate sector from a wireless terminal, routing the handoff request to the disparate sector, receiving a handoff response for the wireless terminal from the disparate sector, and transmitting the handoff response to the wireless terminal.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
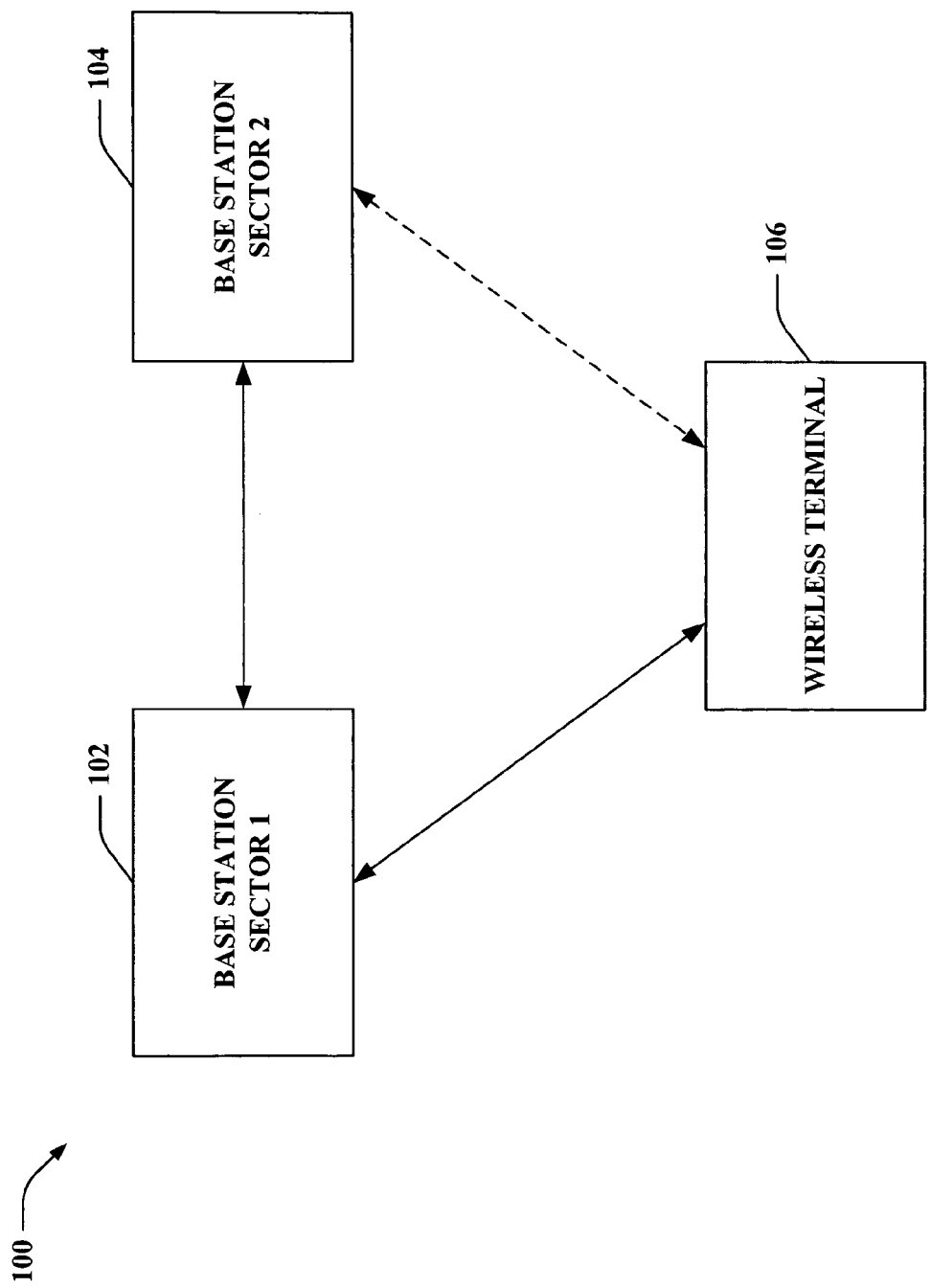
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem.

A base station (e.g., access point) may refer to a device in an access network that communicates over the air-interface, through one or more sectors, with wireless terminals. The base station may act as a router between the wireless terminal and the rest of the access network, which may include an IP network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, various media capable of storing, containing, and/or carrying instruction(s) and/or data.

Referring now to FIG. 1, a wireless communication system 100 is illustrated in accordance with various embodiments presented herein. System 100 can comprise any number of base station sectors (e.g., base station sector 1 102, base station sector 2 104, etc.) that receive, transmit, repeat, etc., wireless communication signals to a wireless terminal 106. Base station sector 1 102 and base station sector 2 104 may be associated with the same base station or disparate base stations. Further, it is contemplated that system 100 may include a plurality of wireless terminals similar to wireless terminal 106. Base station sectors 102-104 can comprise transmitter chains and receiver chains, each of which can in turn comprise a plurality of components associated with signal transmission and reception (e.g., processors, modulators, multiplexers, demodulators, demultiplexers, antennas, etc.), as will be appreciated by one skilled in the art. Base station sectors 102-104 may be positioned at fixed locations and/or may be mobile. Wireless terminal 106 can be, for example, a cellular phone, a smart phone, a laptop, a handheld communication device, a handheld computing device, a satellite radio, a global positioning system, a PDA, and/or any other suitable device for communicating over wireless communication system 100. Also, wireless terminal 106 may be fixed or mobile.

Wireless terminal 106 may communicate with base station sectors 102-104 (and/or disparate base station sector(s)) on a downlink and/or an uplink channel at any given moment. The downlink refers to the communication link from base station sectors 102-104 to wireless terminal 106, and the uplink channel refers to the communication link from wireless terminal 106 to base station sectors 102-104. Base station sectors 102-104 may further communicate with other base station sector(s) and/or any disparate devices (e.g., servers) (not shown) that may perform functions such as, for example, authentication and authorization of wireless terminal 106, accounting, billing, and so on. Note that the term "sector" may refer to a geographical sector, as is commonly understood, or it may refer to a specific carrier frequency (or a pair of carrier frequencies) on which uplink and downlink transmissions are carried. Thus, "base station sectors" may refer to two geographical sectors covered by the same base station, or two carrier frequencies in the same geographical area.

System 100 enables mitigating delay associated with handing off from a first base station sector (e.g., base station sector 1 102) to a second base station sector (e.g., base station sector 2 104); such delay may be the time that wireless terminal 106 is neither connected to the first base station sector nor the second base station sector. A current link may exist between wireless terminal 106 and base station sector 1 102, for instance, such that wireless terminal 106 may be physically connected to base station sector 1 102. The link between wireless terminal 106 and base station sector 1 102 may have been established in any manner. Wireless terminal 106 may detect a signal (e.g., beacon) emanating from base station sector 2 104 and decide to initiate a handoff from base station sector 1 102 to base station sector 2 104. Wireless terminal 106 may determine to handoff to base station sector 2 104 based upon an evaluation of the signal (e.g., signal strength, SNR, signal quality, etc.) received at wireless terminal 106.

Wireless terminal 106 may effectuate the handoff to base station sector 2 104 by employing the current link to base station sector 1 102. Various signals may traverse through base station sector 1 102 (e.g., transmitted by wireless terminal 106, base station sector 2 104, etc.) to enable setting up the new link between wireless terminal 106 and base station sector 2 104. Thus, at least a portion of the initialization may be performed prior to a physical switch to base station sector 2 104 (e.g., before a physical connection exists between wireless terminal 106 and base station sector 2 104).

Upon detecting the signal (e.g., beacon) emanating from base station sector 2 104 and deciding to effectuate the handoff, wireless terminal 106 may derive a connection identifier (CID) related to base station sector 2 104. Wireless terminal 106 may send a handoff request (e.g., expedited handoff request) over the current link to base station sector 1 102; base station sector 1 102 may thereafter route the handoff request to base station sector 2 104. Pursuant to an illustration, the handoff request may include the derived CID associated with base station sector 2 104. According to a further example, the handoff request may be a layer 2 message that indicates that the handoff is associated with the base station sector related to the derived CID.

In response to the handoff request, base station sector 2 104 may transmit a handoff response to base station sector 1 102, which may thereafter be transmitted to wireless terminal 106. The handoff response may include identified information provided by base station sector 2 104 that may be utilized in connection with establishing a link between wireless terminal 106 and base station sector 2 104. The identified information may include, for example, a session ON ID, an active ID, an allocated access slot (e.g., reserved for wireless terminal 106), timing information, an identification of a destination media access control (MAC) state (e.g., ON state, HOLD state, SPLIT-TONE ON state, etc.), a time period during which an assigned ID (e.g., MAC ID, session ON ID, active ID, etc.) is valid, and the like.

Wireless terminal 106 may utilize the identified information obtained with the handoff response and establish a link with base station sector 2 104. By way of example, wireless terminal 106 may break the link with base station sector 1 102 prior to establishing the link with base station sector 2 104 (e.g., when base station sector 1 102 and base station sector 2 104 are associated with disparate carriers). According to another illustration, if base station sector 1 102 and base station sector 2 104 employ the same carrier, wireless terminal 106 may simultaneously connect to both base station sectors 102-104 (and the link between wireless terminal 106 and base station sector 1 102 need not be broken).

Conventional physical (PHY) access operations to obtain a physical connection between wireless terminal 106 and base station sector 2 104 may be modified by utilizing the identified information associated with the handoff response. In an exemplary access scheme, wireless terminal 106 and base station sector 2 104 may transfer information associated with an access request, access grant and access exchange. For some expedited handoffs effectuated by system 100 (e.g., corresponding to the same logical link controller), access request/access grant signaling conveying timing and power corrections and/or access exchange signaling may be skipped. According to an illustration, N bits, where N may be any integer (e.g., 2 bits), in the handoff response message from base station sector 2 104 may explicitly indicate which part(s) of physical access layer operations to perform or skip (e.g., skip access exchange signaling, skip entire access procedure, etc.).

Resources in an access interval of an uplink channel structure may be shared between a paging acknowledgment channel and a dedicated access request channel. The resources may typically be dedicated to paging acknowledgement segments; however, the resources may sometimes dynamically reallocate for use as a dedicated (contention free) access request segment as part of an expedited handoff. When the resource is to be utilized as a dedicated access request segment, the base station sector may skip the corresponding downlink page, which may need to be acknowledged with the same resource of access request segment. Note that if the base station sector sends the corresponding downlink page, then the paged wireless terminal transmits a page response signal in the same resource, thereby resulting in collision. By sharing the air link resources and performing dynamic reallocation from a paging acknowledgment usage to a dedicated uplink access segment usage, efficient use of resources may be achieved with minimal disruptions to ongoing paging operations.

Figure 2:
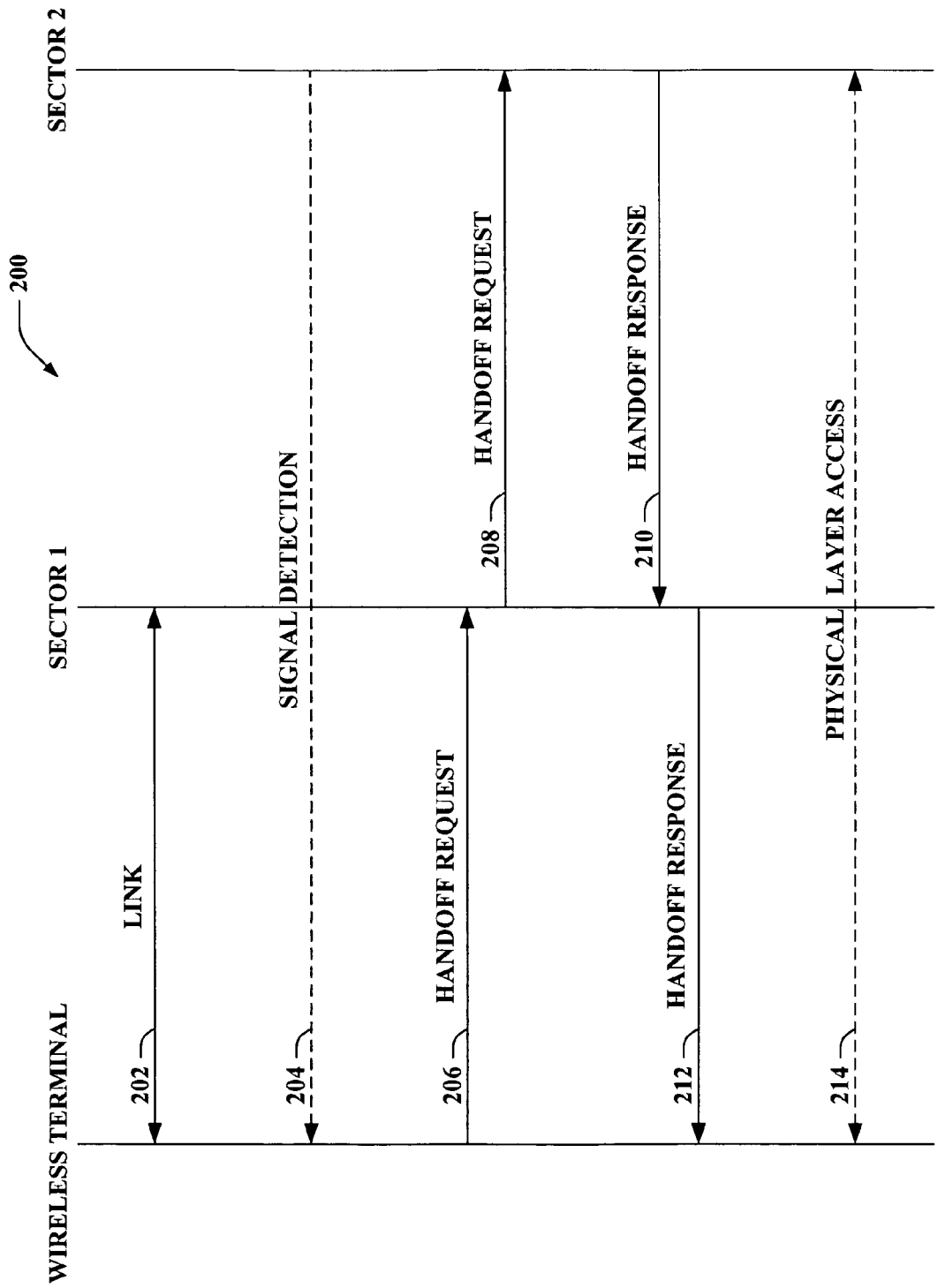
FIG. 2 is an illustration of an exemplary schematic for performing an expedited handoff from a first sector to a second sector.

With reference to FIG. 2, illustrated is an exemplary schematic 200 for performing an expedited handoff from a first sector (e.g., sector 1, base station sector 1 102 of FIG. 1) to a second sector (e.g., sector 2, base station sector 2 104 of FIG. 1). A wireless terminal (e.g., wireless terminal 106 of FIG. 1) may have a previously established link 202 (e.g., physical connection) associated with sector 1. The wireless terminal may detect a signal 204 (e.g., beacon) from sector 2. For example, the wireless terminal may continuously obtain and evaluate received signals emanating from sector(s) (e.g., sector 2) other than sector 1. Based on an analysis (e.g., strength, signal to noise ratio, etc.) of signal 204, the wireless terminal may decide to effectuate a handoff. For example, the wireless terminal may select to perform a handoff even if a signal quality of signal 204 is inferior to a signal quality associated with sector 1 when sector 1 and sector 2 utilize the same carrier since the wireless terminal may concurrently connect to both sectors. When sector 1 and sector 2 utilize different carriers, the wireless terminal may effectuate a handoff if signal quality related to detected signal 204 associated with sector 2 is greater than the signal quality associated with sector 1, since link 202 may be dropped (e.g., if wireless terminal is a narrowband mobile). Further, based upon detected signal 204, the wireless terminal may derive a connection identifier (CID) that corresponds to sector 2.

The wireless terminal may generate an expedited handoff message. For instance, the expedited handoff message may include the CID associated with a sector (e.g., sector 2) and/or carrier to which a link is to be established. Additional parameters (e.g., CID associated with disparate, current connection(s) in addition to link 202, etc.) may also be included in the expedited handoff message. The message may be transmitted as a handoff request 206 to sector 1 via the existing link. Further, the CID may identify to sector 1 a disparate sector (e.g., sector 2) to which the handoff request is to be routed. For example, sector 1 may translate the CID associated with sector 2 to yield a routable address and/or may encapsulate handoff request 206 based upon an IP protocol. Moreover, sector 1 may incorporate a mobile identifier related to the wireless terminal with the handoff request. Additionally or alternatively, the wireless terminal may include its related mobile identifier in handoff request 206 transmitted to sector 1.

Sector 1 thereafter forwards handoff request 208 to sector 2. Sector 2 may identify that handoff request 208 was transmitted by sector 1, and not over the air. Sector 2 may determine whether to grant the request. Pursuant to an example, sector 2 may initiate an exchange of encryption keys (not shown) with the wireless terminal via sector 1. According to this example, downlink and uplink communication between sector 2 and the wireless terminal pertaining to encryption key exchange may be routed through sector 1.

Sector 2 may allocate resources to wireless terminal; these allocated resources may be included in a handoff response 210 as identified information, which may be transmitted to sector 1. The identified information may be, for instance, an allocated access slot, timing information, MAC layer identifier(s) (e.g., a session ON ID utilized in session ON state, an active ID employed in an active state), information identifying a destination MAC state, a time period during which an assigned ID is valid, and so forth. Sector 1 may further communicate with the wireless terminal to provide handoff response 212.

By way of example, the wireless terminal may obtain a contention-free access slot in the received handoff response 212. The contention free access slot may be in a dedicated portion of an access channel. The contention free access slot may not be statically reserved for expedited handoff and may be utilized for other purposes (e.g., acknowledgment for paging). However, once a given contention free access slot is allocated for an expedited handoff, the slot may not be utilized for any disparate purpose. Further, by way of illustration, in a time interval of 11.4 ms, there may be 7 access slots available for access. Six of the seven access slots can be used by any access wireless terminal, thus subject to contention, while the seventh access slot may be utilized for contention-free access in the sense that only an allocated wireless terminal is allowed to use the seventh access slot. However, the claimed subject matter is not so limited. The contention-free access slot may allow the wireless terminal to remain connected to sector 1 until immediately prior to the allocated time, and then use the allocated content-free access slot to access sector 2. Without the concern of collision, the wireless terminal may be admitted into sector 2 with high certainty. Hence, handoff delays may be mitigated. In contrast, conventional physical layer access oftentimes utilizes a contention based model associated with an access channel upon which requests from any number of wireless terminals may collide, interfere, etc. due to concurrent transmission over the shared resource; thus, common techniques may be associated with delays based upon access request(s) transmitted by the wireless terminal not being granted because of collisions, interference, etc. associated with access requests associated with disparate wireless terminals.

Further, a link may be established between the wireless terminal and sector 2 via physical layer access 214. For instance, conventional physical layer access may be employed (e.g., with contention-based random access). Alternatively, the wireless terminal may use to the allocated contention-free access slot to establish the link. Pursuant to another illustration, various signaling associated with physical layer access may be omitted as described below. Although not depicted, it is to be appreciated that the link between the wireless terminal and sector 1 may be broken prior to physical layer access 214. Thus, if sector 1 and sector 2 employ differing carriers, such link between the wireless terminal and sector 1 may be severed prior to physical layer access 214.

Figure 3:
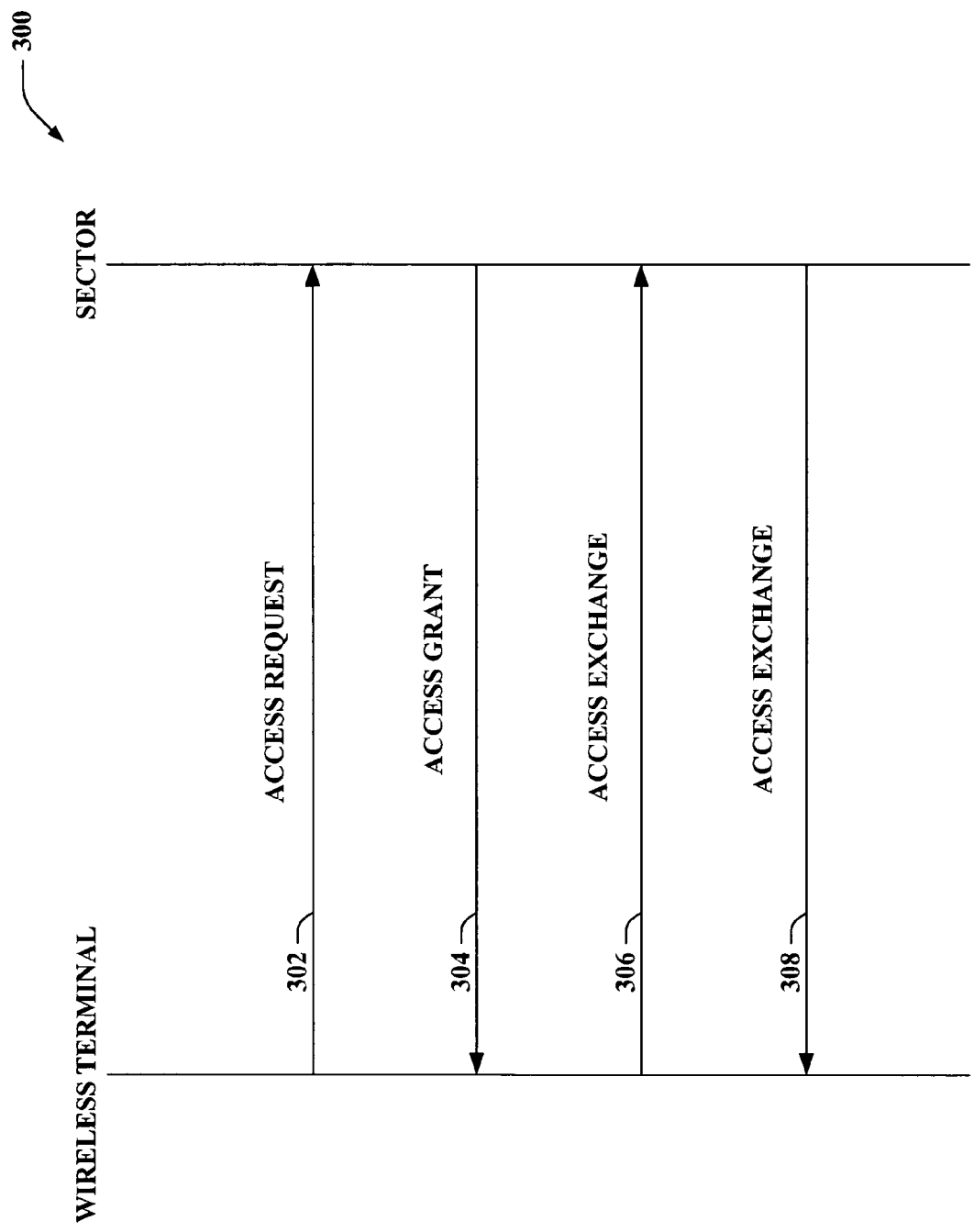
FIG. 3 is an illustration of an exemplary schematic for effectuating physical layer access to a sector that may be employed in connection with an expedited handoff.

With reference to FIG. 3, illustrated is an exemplary schematic 300 for effectuating physical layer access to a sector (e.g., base station sector 2 104 of FIG. 1, sector 2 of FIG. 2) that may be employed in connection with an expedited handoff. A wireless terminal (e.g., wireless terminal 106 of FIG. 1, wireless terminal of FIG. 2) may initiate physical layer access after severing a currently established link to another sector (e.g., base station sector 1 102 of FIG. 1, sector 1 of FIG. 2). According to another illustration, physical layer access may be effectuated without breaking the established link when performing an intracarrier handoff; thus, the wireless terminal may connect to more than one sector concurrently in such a case.

The wireless terminal begins physical layer access by transmitting an access request 302 to the sector. Access request 302 may be a lightweight request. Further, wireless terminal may send access request 302 during a dedicated, contention-free access slot. For instance, the dedicated access slot may have been allocated by the sector and an indication associated therewith may have been obtained by the wireless terminal with a handoff response via a previous sector to which the wireless terminal had a link. By employing contention-free access techniques, the wireless terminal may be able to break an established link and initiate creating a new physical connection at a known time and with a mitigated possibility of collision with a disparate wireless terminal. Pursuant to another illustration, wireless terminal may transmit access request 302 over a contention-based access channel.

In response to access request 302, sector may transmit an access grant 304 to the wireless terminal. In the contention-based model, access request 302 may collide with disparate access request(s), which may yield a delay associated with the sector sending access grant 304. However, this latency may be mitigated via utilizing a contention-free access slot for access request 302, and therefore, handoff optimization may be improved.

Uplink access exchange 306 and downlink access exchange 308 may thereafter be employed. For instance, the wireless terminal may transmit a small amount of data (e.g., a random number) to the sector via uplink access exchange 306, and the sector may echo the data in the downlink access exchange 308 to resolve possible undetected collision(s) associated with access request 302. Further, sector may include information (e.g., related to allocated resources) such as a session ON ID (SON ID) and/or an active ID (actID) in downlink access exchange 308. Pursuant to an illustration, the wireless terminal may have obtained a SON ID and/or an actID with a handoff response from the sector as discussed above; thus, uplink access exchange 306 may include information indicating that the sector previously granted the handoff response and assigned these resources to the wireless terminal and sector need not provide such information in downlink access exchange 308. Moreover, the wireless terminal and the sector may use the encryption parameters, which have been established between the wireless terminal and the sector via a previous sector to which the wireless terminal had a link.

Figure 4:
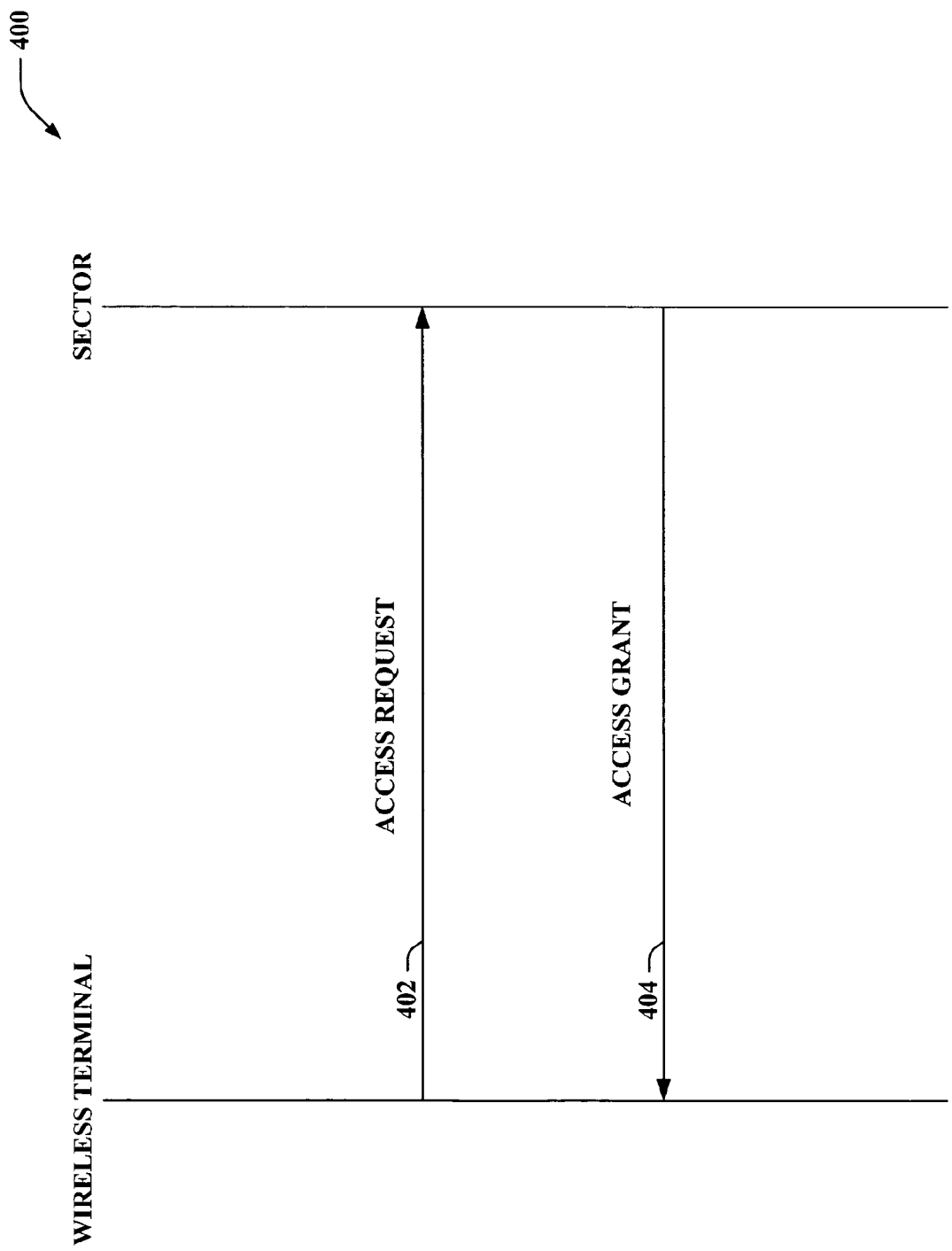
FIG. 4 is an illustration of an exemplary schematic for optimized physical layer access associated with an expedited handoff.

Referring to FIG. 4, illustrated is an exemplary schematic 400 for optimized physical layer access associated with an expedited handoff. For instance, an access request 402 may be transmitted by a wireless terminal to a sector in connection with contention-free access. By employing dedicated resources, a probability of collision between access request 402 and a disparate access request associated with another wireless terminal may be reduced. In response to access request 402, the sector may transmit an access grant 404 to the wireless terminal. Access request 402 and access grant may be utilized for time synchronization. According to an example, base stations oftentimes are not synchronized; thus, when the wireless terminal effectuates a handoff from a first sector to a second sector, time synchronization may be employed during physical layer access (e.g., access request 402, access grant 404) associated with the second sector. Further, by sending the access signal with the allocated contention-free access slot, the wireless terminal effectively identifies itself to the sector so that the wireless terminal and the sector can start to use the identification information (e.g., MAC layer ID(s)), which have been established between the wireless terminal and the sector via a previous sector to which the wireless terminal had a link.

Exemplary schematic 400 may omit uplink and downlink access exchanges as described in FIG. 3 and commonly employed in conventional techniques. Such access exchanges oftentimes may be utilized to mitigate collisions and/or provide identification information (e.g., MAC layer ID(s)). However, by utilizing contention-free access and obtaining such identification information via the handoff response described above, the access exchange signaling may be skipped and a handoff may be further optimized. It is to be appreciated that the sector may provide an indication to the wireless terminal indicating that the access exchange signaling may be omitted (e.g., as part of the handoff response, access grant, etc.).

Pursuant to another illustration, two sectors of the same base station may be synchronized in terms of Orthogonal Frequency Division Multiplexing (OFDM) time. The OFDM time associated with a base station sector may be the timing to which a wireless terminal synchronizes when accessing the base station sector to enable providing a common understanding of time between the base station sector and wireless terminal(s). Thus, if a wireless terminal hands-off from one sector to the other sector of the same base station, the wireless terminal may skip access request 402 and access grant 404 associated with physical layer access. In such a case, the wireless terminal may directly transfer (e.g., at a predetermined time) from one ON state in a first base station sector to another ON state in a second base station sector without having to perform physical layer access upon receipt of the handoff response. The two sectors may be in the same base station and thus timing synchronized. Therefore, if the wireless terminal has been timing synchronized with the first sector, the wireless terminal is also timing synchronized with the second sector.

Figure 5:
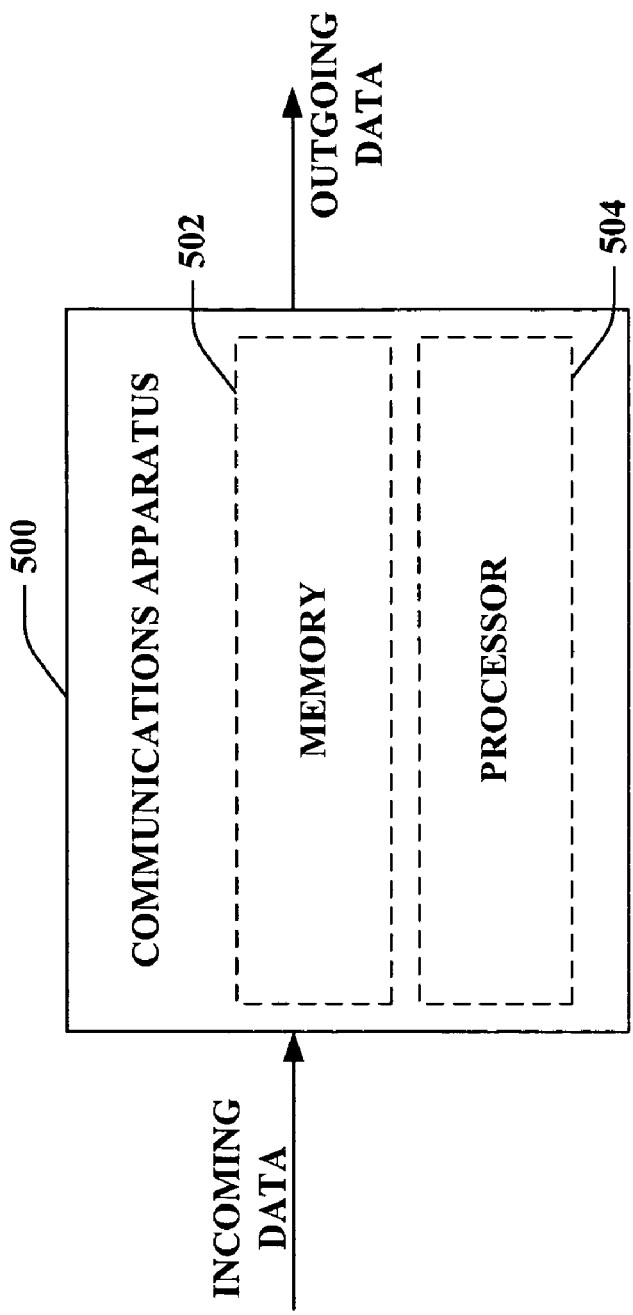
FIG. 5 is an illustration of a communications apparatus that can be employed to mitigate handoff delays via utilizing an established connection.

Now referring to FIG. 5, a communications apparatus 500 that can be employed to mitigate handoff delays via utilizing an established connection is illustrated. Communications apparatus 500 can be a wireless communications apparatus, for instance, such as a wireless terminal. Additionally or alternatively, communications apparatus 500 can be resident within a wired network. Communications apparatus 500 can include memory 502 that can retain information associated with parameters pertaining to a handoff request and/or instructions for effectuating a handoff from a first sector to a second sector. Additionally, communications apparatus 500 may include a processor 504 that can execute instructions within memory 502 and/or instructions received from another network device.

In an example, communications apparatus 500 can be a base station sector. In such an example, memory 502 can retain instructions for determining whether to grant or deny a handoff request, identifying resources to allocate in response to a handoff request, incorporating identification information in handoff requests, and/or routing information between a wireless terminal and a disparate base station sector. Processor 504 can be employed in connection with executing such instructions.

In yet another example, communications apparatus 500 can be a terminal, such as a wireless terminal. In this example, memory 502 can include instructions for detecting a signal from a second sector. Processor 504 can be configured to execute such signal detect and analysis. Processor 504 can also be utilized to transmit an expedited handoff request via a first sector to the second sector, receive a handoff response from the second sector through the first sector, and/or establish a link with the second sector.

FIGS. 6-9 relate to an ACCESS state that may be utilized in conjunction with various aspects of the claimed subject matter. A wireless terminal (WT) in the ACCESS state may attempt to establish a connection to a base station sector (BSS). The ACCESS state is a transient state, where the WT and the BSS go through a sequence of operations, and if successful, migrate to the ON, HOLD or SLEEP state.

The following channels may be utilized in connection with an ACCESS state.

The DL.BCH.BN, DL.BCH.TS, DL.BCH.BST channels: The segments of those channels are broadcast. The WT may receive the segments of those channels. The BSS may transmit all those channel segments.

The DL.PICH channel: The segments of the DL.PICH channel are broadcast. The WT may receive the DL.PICH segments. The BSS may transmit all the DL.PICH segments.

The UL.ACH.AR channel: The segments of the UL.A-CH.AR channel are contention-based. The WT may use any of the UL.ACH.AR segments. The BSS may receive all the UL.ACH.AR segments.

The DL.GXCH channel: The segments of the DL.GXCH channel can be used in one of two scenarios. In the first scenario, the DL.GXCH segments are broadcast. After the WT has sent the UL.ACH.AR segment for access request, the WT may receive the corresponding DL.GXCH segment to determine whether the segment has been detected by the BSS. The BSS may transmit the access grant message in the corresponding DL.GXCH segment if it has detected any UL.A-CH.AR segment for access request. In the second scenario, the DL.GXCH segments are shared. After the WT has sent the UL.AXCH segment for access exchange, the WT may receive the corresponding DL.GXCH segment to receive the access exchange message from the BSS. In this case, the assignment of the DL.GXCH segment is implicitly given in the corresponding UL.AXCH segment. The WT may receive the DL.GXCH segment if the WT sent the corresponding UL.AXCH segment. The BSS may transmit the DL.GXCH segment if it has received the corresponding UL.AXCH segment.

The UL.AXCH channel: The segments of the UL.AXCH channel are shared. The assignment of the UL.AXCH segment is implicitly given in the corresponding DL.GXCH segment. In the operations where the procedure of access exchange is not skipped, the WT may transmit the UL.AXCH segment if the WT received the access grant message in the corresponding DL.GXCH, and the BSS may receive the UL.AXCH segment if the BSS sent an access grant message in the corresponding DL.GXCH to the WT.

Figure 6:
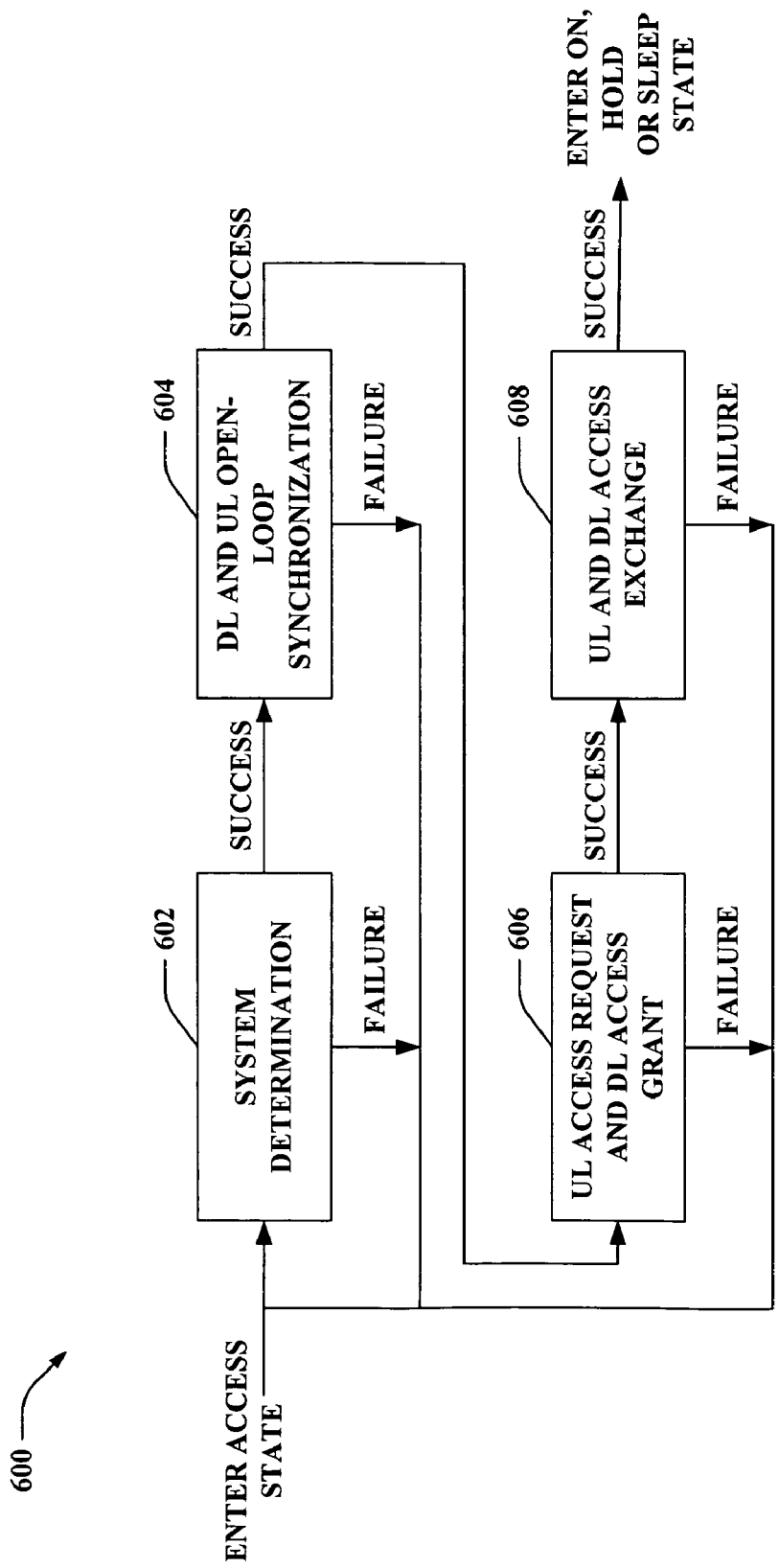
FIG. 6 is a flow chart including various operations associated with an ACCESS state.

With reference to FIG. 6, illustrated is a flow chart 600 including various operations associated with an ACCESS state. At 602, a system determination may be effectuated. The WT may use the DL.BCH.BN, DL.BCH.TS, DL.BCH.BST and DL.PICH channels to identify and select an appropriate BSS and tone block to which a connection may be made. A tone block may be a set of frequencies that the WT and BSS may utilize to form a connection. At 604, an open-loop synchronization may be performed. The WT may synchronize its receiver with the downlink (DL) signal of the selected BSS in the selected tone block, and may set its own transmit parameters based on the acquired receiver synchronization. At 606, an operation associated with access request and grant may be conducted. The WT may transmit an uplink (UL) access request message to the BSS using the UL.ACH.AR channel, and receive a DL access grant message from the DL.GXCH channel. At 608, an access exchange may be performed. The WT transmits an access exchange request message in the UL.AXCH channel, requesting the service type desired. The BSS responds via the DL.GXCH channel with an access exchange response message. In some operations as specified below, the procedure of access exchange may be skipped.

After the WT enters the ACCESS state, the WT may go through at least one access cycle. Each access cycle may begin with the operation of system determination 602, possibly followed by the operations of open-loop synchronization 604, access request and grant 606, and finally access exchange 608. The set of the operations to be carried out in each access cycle depend on the particular protocol used by the WT and are described below.

If all the operations in an access cycle succeed, the access cycle is successful and may terminate as the BSS and the WT transition to the ON, HOLD or SLEEP state. If any of the operations fail, an access failure occurs and the WT may immediately terminate the current access cycle. In general, after an access failure, the WT may wait for a certain period of time before attempting a new access cycle. However, a new access cycle may start immediately. After a predefined number of unsuccessful access cycles have been made, the WT may give up the access attempt and generate an error message to the upper layer.

Figure 7:
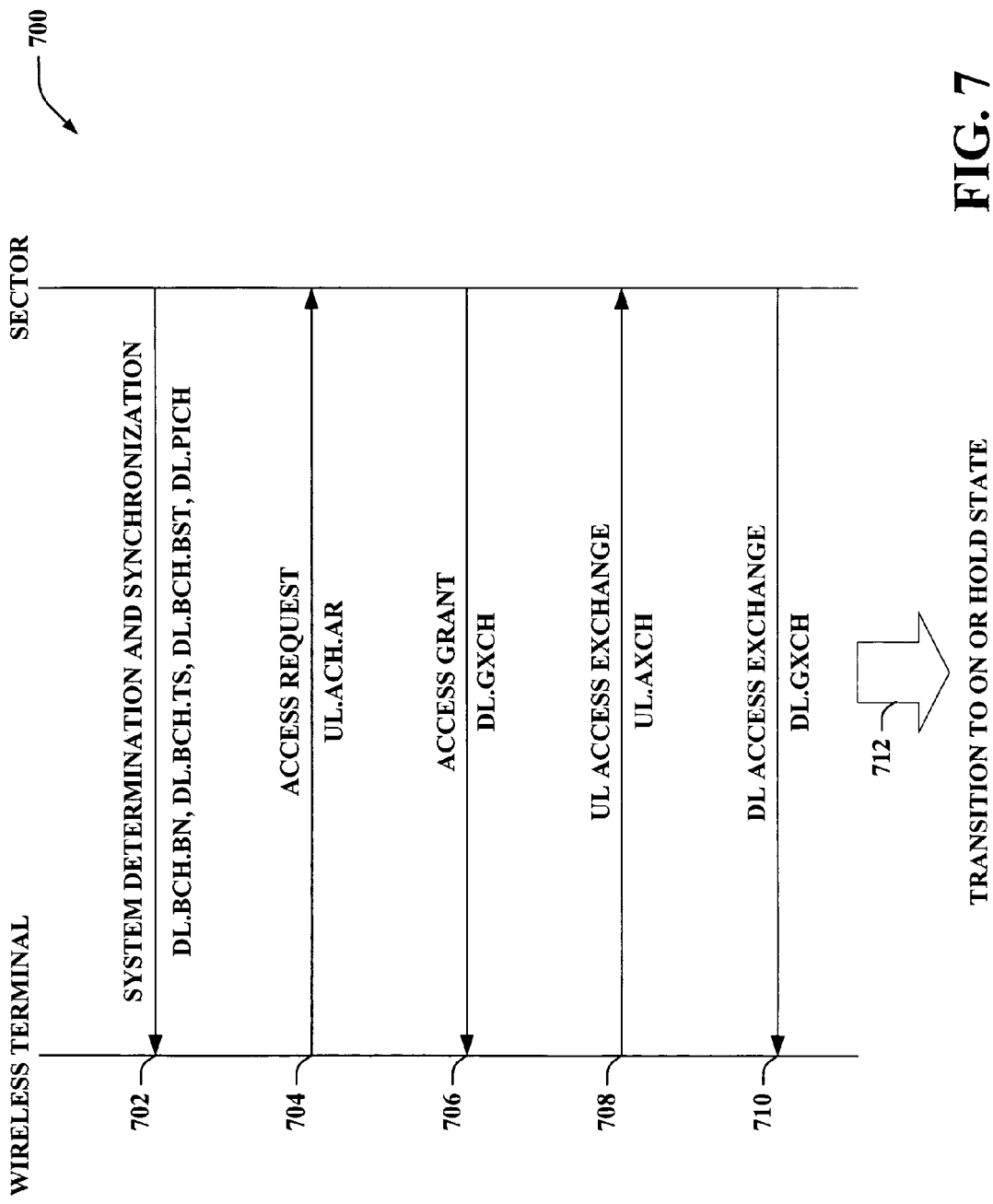
FIG. 7 is an exemplary schematic associated with random access, which may be carried out when the wireless terminal (WT) in the SLEEP or NULL state intends to migrate to the ON or HOLD state with the base station sector (BSS).

With reference to FIG. 7, illustrated is an exemplary schematic 700 associated with random access, which may be carried out when the WT in the SLEEP or NULL state intends to migrate to the ON or HOLD state with the BSS. Operation associated with exemplary schematic 700 may be used by the WT, which does not have a valid wtActiveID assigned by the BSS. The WT may have had or still have a connection with another BSS.

System determination and synchronization 702. The WT may receive the DL.BCH.BN, DL.BCH.TS, DL.BCH.BST, and DL.PICH channels to identify and select an appropriate BSS to make a connection. From these DL channels, the WT may acquire system parameters such as bssSlope, bssSectorID, bssSectorType, wtOpenLoopPowerOffset and dlUltraslotSuperslotIndex. The BSS and the WT may further carry out the open-loop synchronization operations according to the open-loop frequency, timing and power control procedures.

Access request 704. When the WT intends to transmit an access request in a superslot, the WT may randomly select and transmit one of the UL.ACH.AR segments in the superslot to the BSS. The BSS may receive all UL.ACH.AR segments of each superslot, and attempt to detect UL.ACH.AR segments transmitted by any WT.

Access grant 706. After the WT transmits an UL.ACH.AR segment, the WT may receive the corresponding DL.GXCH segment to determine whether the UL.ACH.AR segment has been granted by the BSS. After the BSS detects the presence of an UL.ACH.AR segment transmitted by the WT, the BSS may send an access grant message in the corresponding DL.GXCH segment to grant the UL.ACH.AR segment.

UL access exchange 708. After the WT is granted access by the DL.GXCH segment, the WT may transmit the corresponding UL.AXCH segment of the DL.GXCH segment. The WT may indicate in the UL.AXCH segment that it intends to migrate to the ON or HOLD state of the BSS and provides related configuration information. After the BSS transmits the access grant message in the DL.GXCH segment, the BSS may receive the corresponding UL.AXCH segment of the DL.GXCH segment.

DL access exchange 710. After the BSS receives the UL.AXCH segment, the BSS may transmit the corresponding DL.GXCH segment of the UL.AXCH segment. The BSS may specify assignment and configuration information in the DL.GXCH segment. The BSS may assign the MAC state (ON or HOLD) to which the WT may migrate after the ACCESS state. After the WT transmits the UL.AXCH segment, the WT may receive the DL.GXCH.

MAC state transition 712. The BSS and the WT may migrate to the MAC state assigned in the DL access exchange step and use the parameters assigned in the DL access exchange message, such as wtActiveID, wtOnID, and wtOnMask in the destinated MAC state.

The following relates to access grant 706. The corresponding DL.GXCH segment for UL.ACH.AR segments in an UL superslot is DL.GXCH segment [1] of the concurrent DL superslot. To grant an access request, the BSS may use the "access grant" format in the DL.GXCH segment. In the access grant message, the "index of granted UL.ACH.AR segment" may be set to be the index of the UL.ACH.AR segment to which the access grant message is sent. The access grant may also contain closed-loop timing control and power control commands in the "timing correction" and "power correction" fields respectively. The BSS may measure the received power and timing of the granted UL.ACH.AR segment to calculate the timing control and power control commands. The timing and power adjustment ensures that the UL signal of the WT arrives at the BSS with appropriate power and properly time-aligned to compensate the round-trip propagation delay. With its transmitter timing/power accurately adjusted, the UL signal from the WT will not interfere with the UL signals from the connections of other existing WTs with the BSS in the tone block.

To not grant any access request, the BSS may suspend the transmission of the corresponding DL.GXCH segment of all the UL.ACH.AR segments of an UL superslot. Alternatively, the BSS may send the DL.GXCH segment using the "access grant" format with the "index of granted UL.ACH.AR segment" field being set to 7. If the BSS does not grant any access request, none of the access request in the UL.ACH.AR segments, if any, is granted. The BSS may discard the memory of any UL.ACH.AR segment that was detected in an UL superslot but was not granted in the corresponding DL.GXCH segment.

If the access request of the WT is granted, the WT may use the timing control and power control commands to adjust its transmitter timing and power. If the UL.ACH.AR segment is not granted, the WT may consider the access a failure.

The following relates to UL access exchange 708. The corresponding UL.AXCH segment of the DL.GXCH segment [1] in the DL superslot k is UL.AXCH segment of the UL superslot k+1. The WT may use the "access initialization" format in the UL.AXCH segment. In the UL access exchange message, the "destination MAC state" field may be set to the ON or HOLD state depending on whether the WT intends to migrate to the ON or HOLD state with the BSS after the ACCESS state. If the WT intends to migrate to the ON state, in the "ON MASK" field, the WT may further specify the particular format that the WT requests to use in the UL.DCCH channel. The "ACTIVE ID" field may be set to 0x00, because the WT does not have a valid wtActiveID. The WT may generate and include a random number in the "RAND number" field.

The following relates to DL access exchange 710. The corresponding DL.GXCH segment of the UL.AXCH segment in the UL superslot k+1 is DL.GXCH segment [0] in the DL superslot k+2. If the BSS does not detect a valid UL access exchange message in the UL.AXCH segment, the BSS may send the DL.GXCH segment using the "access exchange for initialization response" format with the "ACTIVE ID" field being set to 0x00. Otherwise, the BSS may send the DL access exchange as follows based on the received UL access exchange message.

To migrate the WT to the ON or HOLD state, the BSS may send the DL access exchange message using the "access exchange for initialization response" format in the DL.GXCH segment. The "ACTIVE ID", "ON ID", and "ON MASK" fields may be set to the wtActiveID, wtOnID, and wtOnMask assigned by the BSS to the WT. If the BSS assigns the WT to the ON state, the BSS may assign valid numbers to all the three above parameters. If the BSS assigns the WT to the HOLD state, the BSS may set "ON ID" field to 0x00. The MAC state assigned by the BSS in the DL access exchange message may not be identical to the MAC state requested by the WT in the UL access exchange message.

The BSS may also set the "RAND number" field in the DL access exchange message to be equal to the "RAND number" field in the received UL access exchange message.

The WT may consider the access a success unless one of the following access failure condition occurs. First, the "access exchange type" fields of the DL and UL access exchange messages are not identical. Second, the "RAND number" fields in the DL and UL access exchange messages are not identical. Third, the "ACTIVE ID" field is set to 0x00.

The following relates to MAC state transition 712. The WT may migrate to the assigned MAC state immediately after it has successfully received the access exchange message and considered the access a success, and may definitely do so in the subsequent superslot after the DL access exchange message is received. The BS may migrate to the assigned MAC state immediately after the DL access exchange message is sent.

Figure 8:
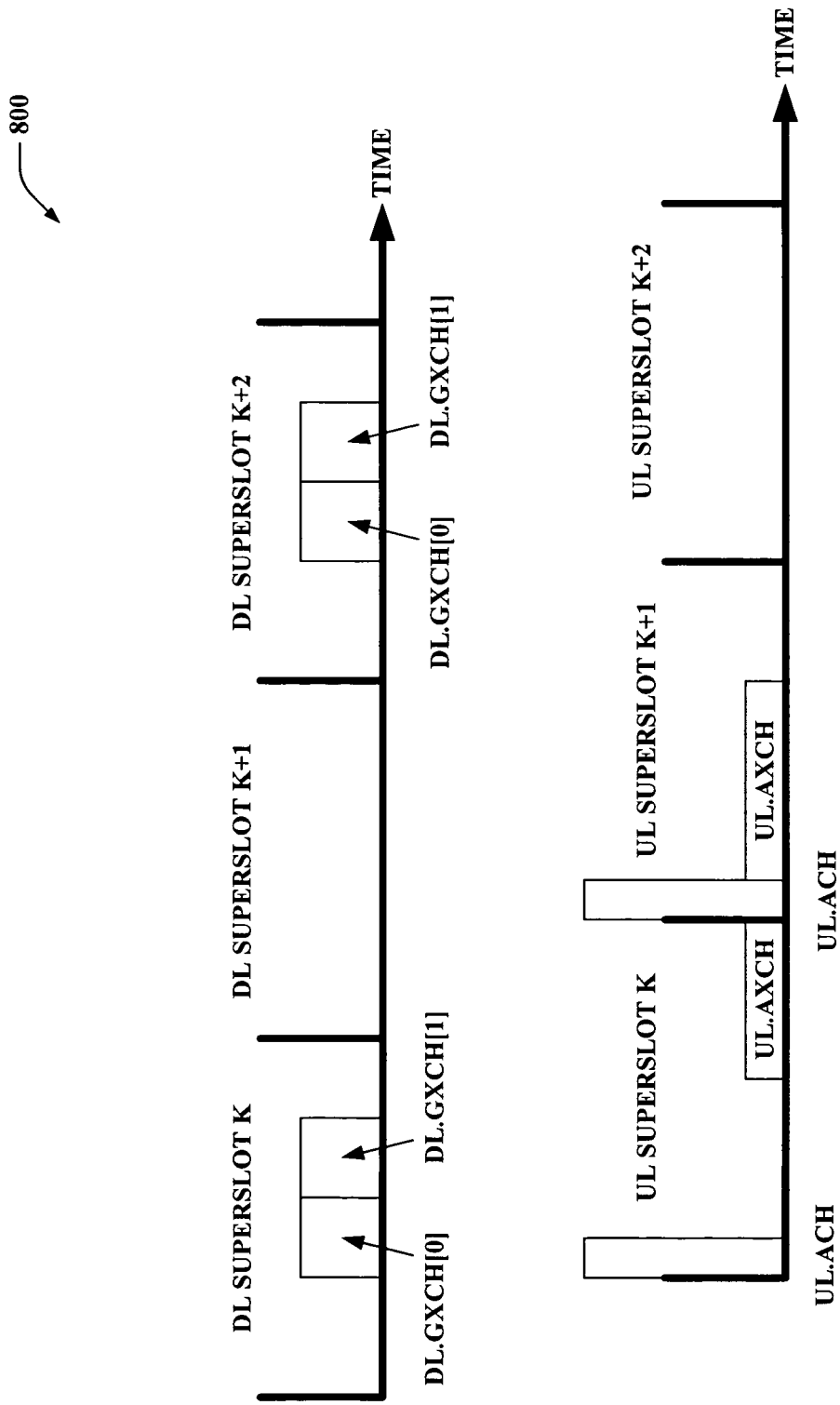
FIG. 8 is an exemplary depiction of various channel segments.

Turning to FIG. 8, illustrated is an exemplary depiction 800 of various channel segments. FIG. 8 shows the relationship among the corresponding UL.ACH, UL.AXCH, and DL.GXCH channel segments. The figure shows the DL and UL signals and the timing is measured at the BSS antenna connectors. The UL.ACH.AR segments in the UL superslot k have a corresponding DL.GXCH segment, which is the DL.GXCH segment [1] in the DL superslot k. The DL.GXCH segment has a corresponding UL.AXCH segment, which is in the UL superslot k+1. The UL.AXCH segment has a corresponding DL.GXCH segment, which is the DL.GXCH segment [0] in the DL superslot k+2. If the final access exchange is sent in the DL superslot k+2, then the BSS may migrate to the assigned MAC state in the middle of DL superslot k+2, and the WT may migrate to the MAC state in the UL superslot k+2 after the WT has successfully received the access exchange message. The WT may migrate to the MAC state in the UL superslot k+3.

In the scenario when the WT migrates to the ON state, the UL superslot k+2 is considered the first UL superslot for the WT to be in the destinated ON state.

Request for Active Connection—Random Access with Preassigned MAC Identifiers. This section specifies the operation of random access, which may be carried out when the WT has a valid wtActiveID assigned by the BSS in an upper layer handoff request and response protocol. The WT may be assigned a wtActiveID by the current BSS in one of the following two scenarios. In the first scenario, the BSS and the WT have already had a connection, which is on a tone block different from the current tone block. The current BSS has assigned a wtActiveID to the WT to be used for establishing a connection in the current tone block. In the second scenario, the WT has had a connection with a different BSS, referred to as a second BSS. The current BSS has assigned a wtActiveID to the WT, via the second BSS, for establishing a connection with the current BSS in the current tone block. The operation may be similar to the above (e.g., FIG. 7), except for the following changes. In the step of UL access exchange, the "ACTIVE ID" field may be set to the valid wtActiveID assigned by the BSS. In the step of DL access exchange, the "ACTIVE ID" field in the DL access exchange message may not necessarily be the same as the "ACTIVE ID" field in the UL access exchange message.

Request for Active Connection—Reserved Access with Preassigned MAC Identifiers. This section specifies the operation of access, which may be carried out when the WT has a valid wtActiveID and a reserved UL.ACH.PA segment assigned by the BSS in an upper layer handoff request and response protocol. The WT may be assigned a wtActiveID and a UL.ACH.PA segment by the current BSS in one of the two scenarios, as described above. In addition, the current BSS may have already assigned to the WT a destination MAC state (ON or HOLD). If the destination MAC state is the ON state, then the current BSS may have already assigned to the WT a valid pair of wtOnID and wtOnMask, which will be used after the WT migrates to the ON state successfully. When the UL.ACH.PA segment has been preassigned to the WT, no paging message may be sent in the corresponding DL.PCH. The operation may be similar to the above (e.g., FIG. 7), except for the following changes. In the step of access request, the WT may send the reserved UL.ACH.PA segment. In the step of access grant, the BSS may set the "index of granted UL.ACH.AR segment" to 6 if the BSS intends to grant the access request sent by the UL.ACH.PA segment. The step of access exchange may be skipped, depending on an upper layer handoff request and response protocol exchange between the WT and the BSS. When the BSS assigns a reserved UL.ACH.PA segment to the WT, the BSS may inform the WT whether the step of access exchange may be skipped. If the step of access exchange may not be skipped, then the WT and the BSS may follow the procedure related to Request for Active Connection—Random Access with Preassigned MAC Identifiers noted above to complete access exchange. If the step of access exchange may be skipped, then the WT may migrate to the preassigned MAC state with the preassigned MAC identifier immediately after it has successfully received the access grant message and considered the access a success, and may do so in the subsequent superslot after the DL access grant message is received. The BS may migrate to the assigned MAC state immediately after the DL access grant message is sent. In the scenario when the WT migrates to the ON state, the UL superslot k shown in FIG. 8 is considered the first UL superslot for the WT to be in the destinated ON state, as the transmission of the UL.AXCH segment in the UL superslot k=1 is skipped.

Figure 9:
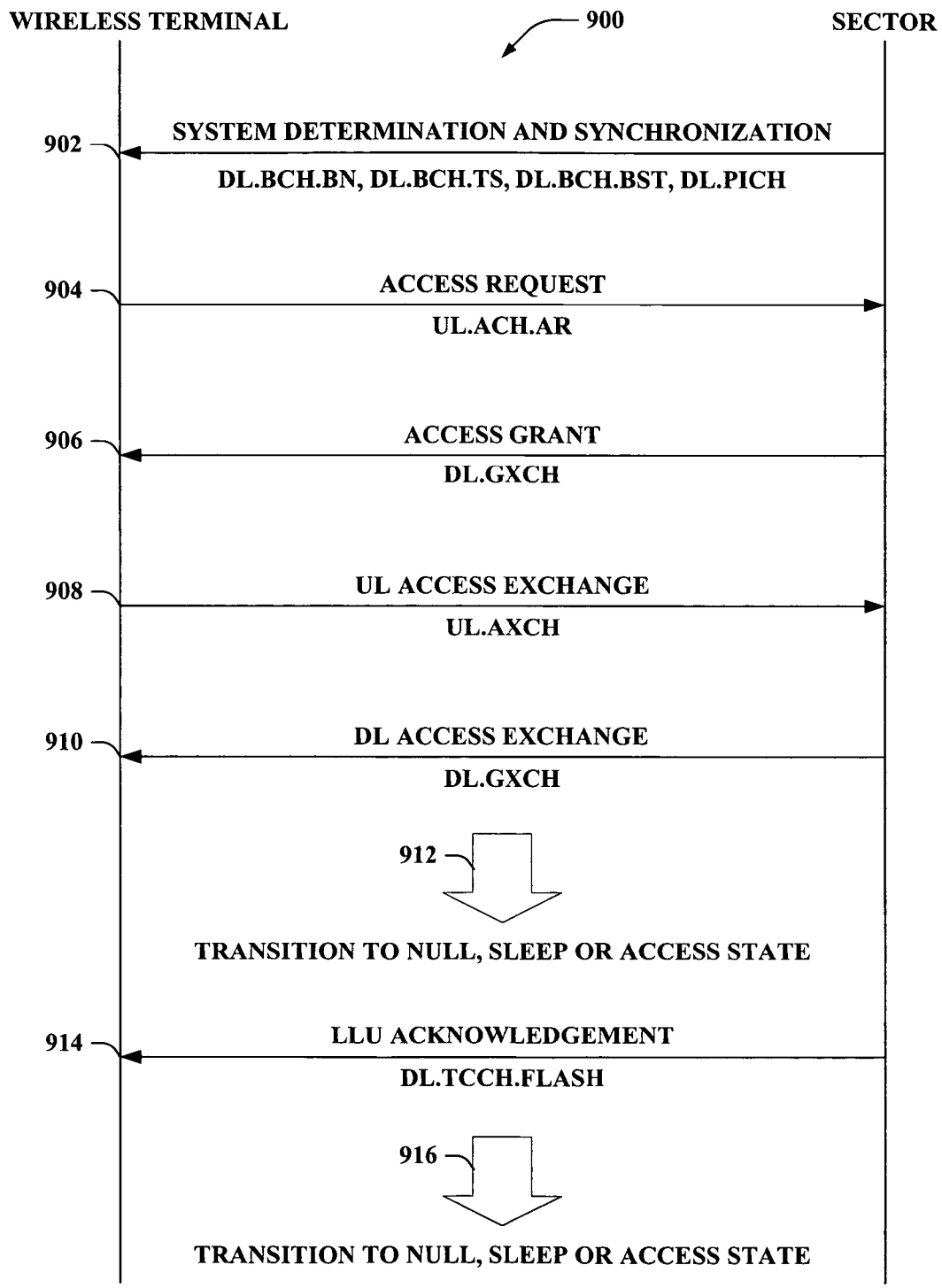
FIG. 9 is an exemplary timing diagram related to physical layer access.

Now turning to FIG. 9, illustrated is an exemplary timing diagram 900 related to physical layer access. For instance, a wireless terminal may have performed an expedited handoff (e.g., transmit a handoff request and obtain a handoff response). Included in a handoff response, the wireless terminal may obtain identified information. The identified information may further comprise an allocated access slot, timing related information, a session ON ID, an active ID, a destination MAC state and/or a time period during which an assigned ID is valid.

Pursuant to an illustration, the wireless terminal may obtain the handoff response at time $t_0$. The identified information associated with the handoff response may indicate a time period during which an assigned ID (e.g., MAC ID, session ON ID, active ID, etc.) is valid (e.g., valid period from time $t_a$ to time $t_b$). The valid period may begin at time $t_a$, which may be substantially the same as time $t_0$. Alternatively, time $t_a$ may be later than time $t_0$.

The handoff response may further include identified information associated with an allocated access slot 902. Allocated access slot 902 may be at a time within the valid period. Further, allocated access slot 902 may enable the wireless terminal to effectuate physical layer access in a contention-free manner, since resources associated with allocated access slot 902 may be reserved for the wireless terminal obtaining the handoff response.

The wireless terminal may effectuate physical layer access at disparate times. For instance, the wireless terminal may initiate physical layer access at A 904 corresponding to allocated access slot 902. Thus, the wireless terminal may utilize reserved resources for establishing a link by sending an access request at the dedicated time (e.g., $t_c$) and obtaining an access grant. Further, uplink and downlink access exchange signaling may be skipped by effectuating physical layer access at A 904. Further, encryption and/or authentication may be skipped in association with time A 904.

Physical layer access may also be performed during the valid period at B 906 or B 908. Time B 906 may be prior to a time associated with allocated access slot 902 and time B 908 may be subsequent to a time related to allocated access slot 902. The wireless terminal may perform random access at B 906-908. Such random access may be contention based and may utilize uplink and downlink access exchange signaling. However, encryption and/or authentication may be skipped.

Further, physical layer access may be effectuated at a time outside of the valid period (e.g., at time C 910). At C 910, random access may be effectuated. Further, uplink and downlink access exchange signaling may be utilized. Moreover, encryption and authentication may be performed (e.g., since a MAC ID provided in a handoff response is no longer valid).

Figure 10:
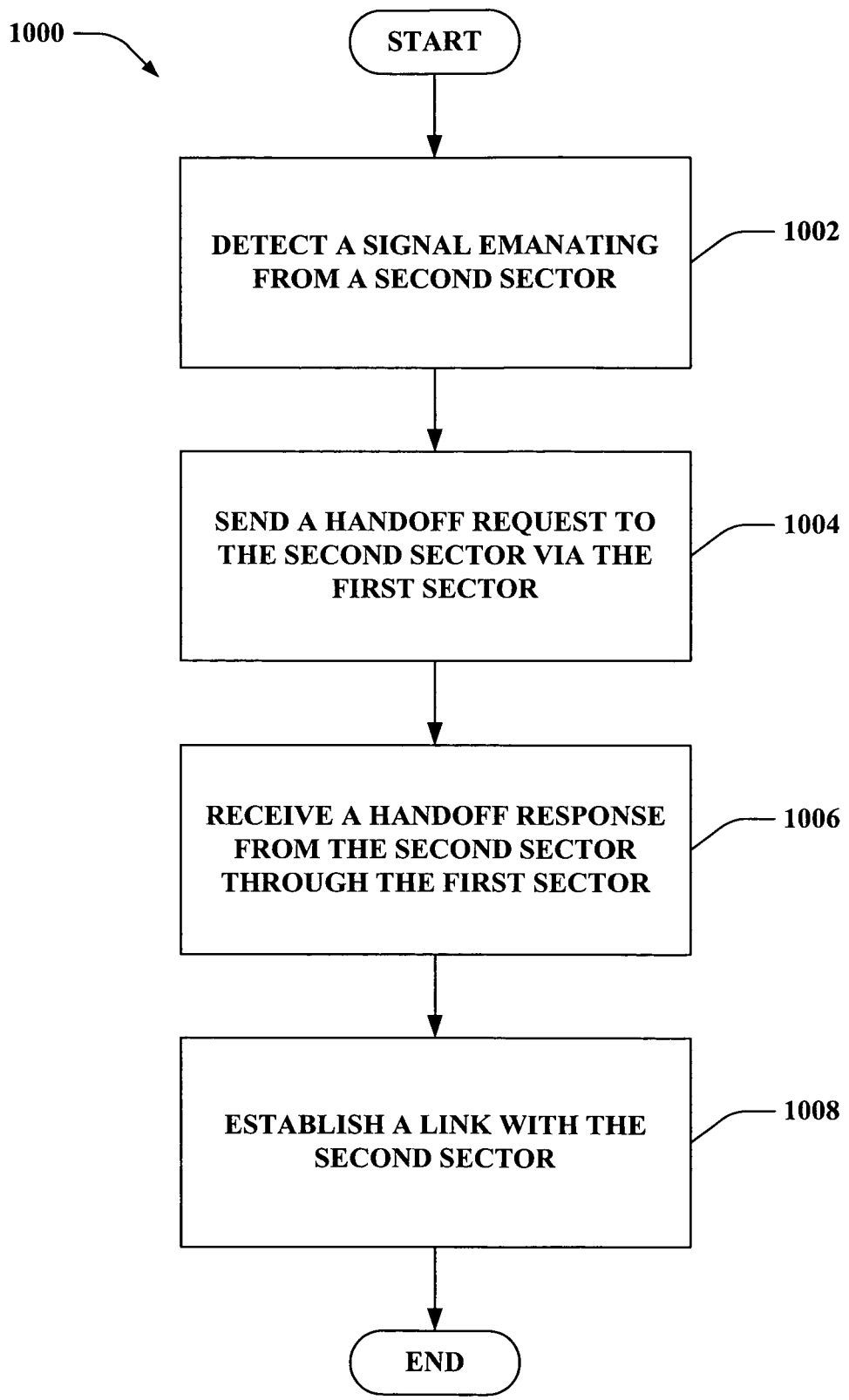
FIG. 10 is an illustration of a methodology that facilitates handing off from a first second to a second sector.
Figure 11:
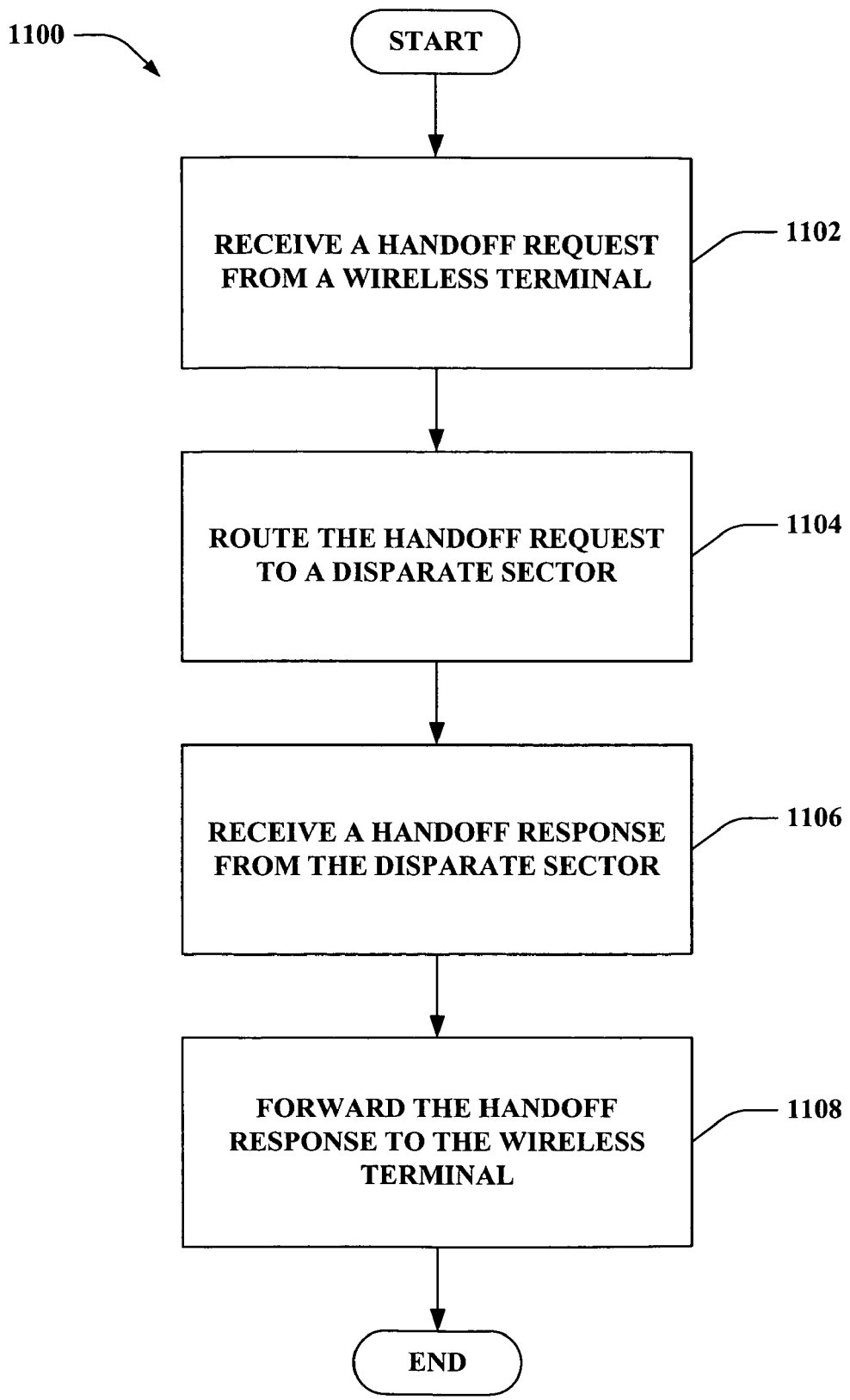
FIG. 11 is an illustration of a methodology that facilitates routing handoff related signals for utilization in association with an expedited handoff.
Figure 12:
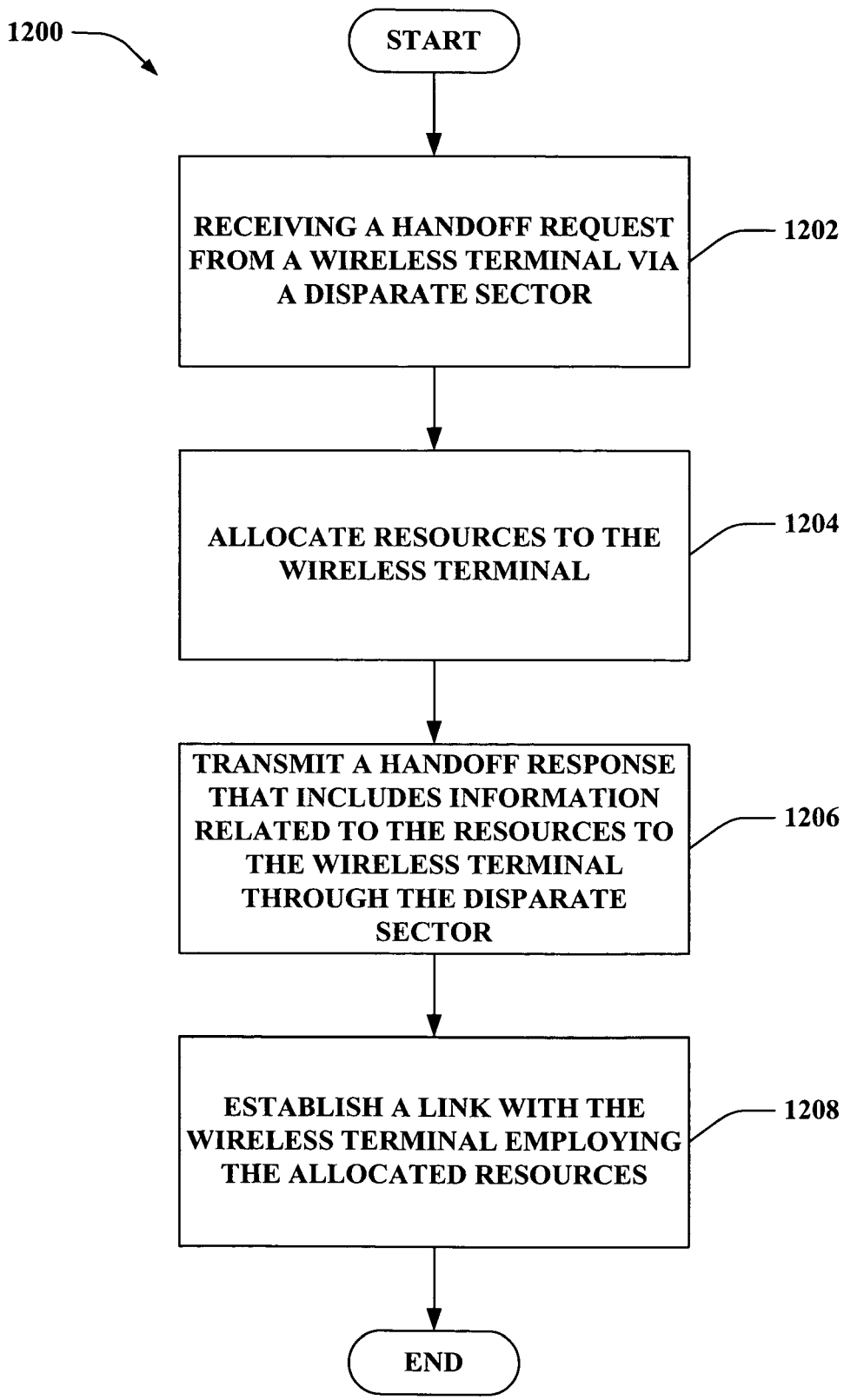
FIG. 12 is an illustration of a methodology that enables allocating resources to a wireless terminal prior to physical layer access to mitigate handoff delay.

Referring to FIGS. 10-12, methodologies relating to efficiently handing off from a first sector to a second sector to mitigate handoff delays are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 10, illustrated is a methodology 1000 that facilitates handing off from a first second to a second sector. At 1002, a signal emanating from the second sector may be detected. For instance, the signal may be a beacon. Further, an analysis of the detected signal may be performed to identify whether to handoff to the sector associated therewith (e.g., the second sector); this analysis may be based on quality of signal, signal strength, intercarrier versus intracarrier handoff, and the like. According to another illustration, a connection identifier (CID) may be derived based upon the detected signal. At 1004, a handoff request may be sent to the second sector via a first link with the first sector. The handoff request may include, for instance, the CID to identify the second sector, a particular carrier, etc. The handoff request may include a wireless terminal identifier (WT ID) and/or a WT ID may be inserted after transmission.

At 1006, a handoff response may be received from the second sector through the first link and the first sector. For example, the handoff response may include identified information. The identified information may relate to an allocated access slot, timing related information, a session ON ID, an active ID, a destination MAC state, a time period during which an assigned ID (e.g., MAC ID, session ON ID, active ID, etc.) is valid, and the like. Pursuant to an illustration, the identified information may include an access slot associated with contention-free access by providing a dedicated access channel. At 1008, a second link may be established with the second sector. The link may be established utilizing the identified information. By way of example, a link with the first sector may be broken prior to establishing the link with the second sector. Alternatively, the link with the first sector may remain intact while the link with the second sector is established. The link may be obtained by employing physical layer access. The identified information may enable omitting a portion of the physical layer access or skipping physical layer access altogether. For instance, to establish the link with the second sector, an access request may be transmitted to the second sector (e.g., in an allocated access slot) and an access grant may be received (e.g., to enable synchronization of timing). For instance, the access grant message may include a timing correction command. Further, a transmitter symbol timing may be adjusted based at least in part upon the timing correction command and signals may be sent to the second sector using the transmitter symbol timing. According to another example, the access request may be transmitted, the access grant may be received, and uplink and downlink access exchange signaling may be performed. According to this example, the uplink access exchange and/or the downlink access exchange may convey an identifier, which may be utilized in connection with the second link once established. Pursuant to a further illustration, a random access slot may be selected and an access signal may be sent in the random access slot to the second sector. In response, an access grant message may be received from the second sector that includes at least a timing correction command. A transmitter symbol timing may be adjusted as a function of the timing correction command and an uplink access exchange may be sent to the second sector using the transmitter symbol timing. For instance, the uplink access exchange may convey at least part of the identified information received in connection with the handoff response. Also, a downlink access exchange may be received from the second sector.

Turning to FIG. 11, illustrated is a methodology 1100 that facilitates routing handoff related signals for utilization in association with an expedited handoff. At 1102, a handoff request may be received from a wireless terminal. For instance, the handoff request may include a CID related to a disparate sector. Additionally, upon receiving the handoff request, wireless terminal related information (e.g., a wireless terminal identifier (WT ID)) may be included in the handoff request. Further, the handoff request may be encapsulated in accordance with an IP protocol. At 1104, the handoff request may be routed to a disparate sector. The routing may be based upon the CID, for instance. According to an example, subsequent to routing of the handoff request, encryption key related information may be obtained from the disparate sector and forwarded to the wireless terminal. Pursuant to this example, a response related to the encryption key related information may be received from the wireless terminal and routed to the disparate sector. At 1106, a handoff response may be received from the disparate sector. At 1108, the handoff response may be forwarded to the wireless terminal. Thereafter, a link to the wireless terminal may be broken; however, the claimed subject matter is not so limited.

With reference to FIG. 12, illustrated is a methodology 1200, used by a base station sector, that enables allocating resources to a wireless terminal prior to physical layer access to mitigate handoff delay. At 1202, a handoff request may be received from a wireless terminal via a disparate sector. By way of example, the handoff request may be differentiated from handoff requests obtained over the air. Further, the handoff request may include an identifier specific to the wireless terminal (e.g., WT ID). Also, a decision may be made as to whether to grant or deny the handoff request. According to another illustration, encryption key signaling information may be transmitted to the wireless terminal through the disparate sector, and received from the wireless terminal via the disparate sector.

At 1204, resources may be allocated to the wireless terminal. For example, the resources may be related to a dedicated access slot, timing related information, a session ON ID, an active ID, a destination MAC state, and so forth. At 1206, a handoff response that includes information related to the resources may be transmitted to the wireless terminal through the disparate sector.

At 1208, a link may be established with the wireless terminal employing the allocated resources. For example, a contention-free physical layer access may be utilized to establish the link. Accordingly, an access request may be obtained and an access grant may be transmitted. Further, the access request and the access grant may enable synchronizing the wireless terminal to a particular time. The base station sector may expect the wireless terminal to transmit the allocated contention-free access signal. Once an access signal arrives from the wireless terminal in accordance with the allocated resources, the base station sector can immediately recognize the wireless terminal and start to use the established parameters (e.g., encryption parameters or MAC identifiers) for the new link. However, if a contention base access signal is employed by the wireless terminal, then the wireless terminal may have to identify itself (e.g., via access exchange) so that the base station sector can recognize the wireless terminal and start to use the established parameters (e.g., encryption parameters or MAC identifiers) for the new link.

It will be appreciated that, in accordance with one or more aspects described herein, inferences can be made regarding identification of signaling to be utilized in connection with physical layer access, determination of times to break an established link with a first sector to enable handing off to a second sector, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding determining signaling to perform in association with physical layer access. According to an example, an inference may be made as to whether various signaling commonly utilized in connection with conventional techniques should be utilized to facilitate establishing a new link between a wireless terminal and a sector. Further, inference may be made as to a time at which to break an established link with a sector to begin physical layer access to create a new link. It will be appreciated that the foregoing examples are illustrative in nature and are not intended to limit the number of inferences that can be made or the manner in which such inferences are made in conjunction with the various embodiments and/or methods described herein.

Figure 13:
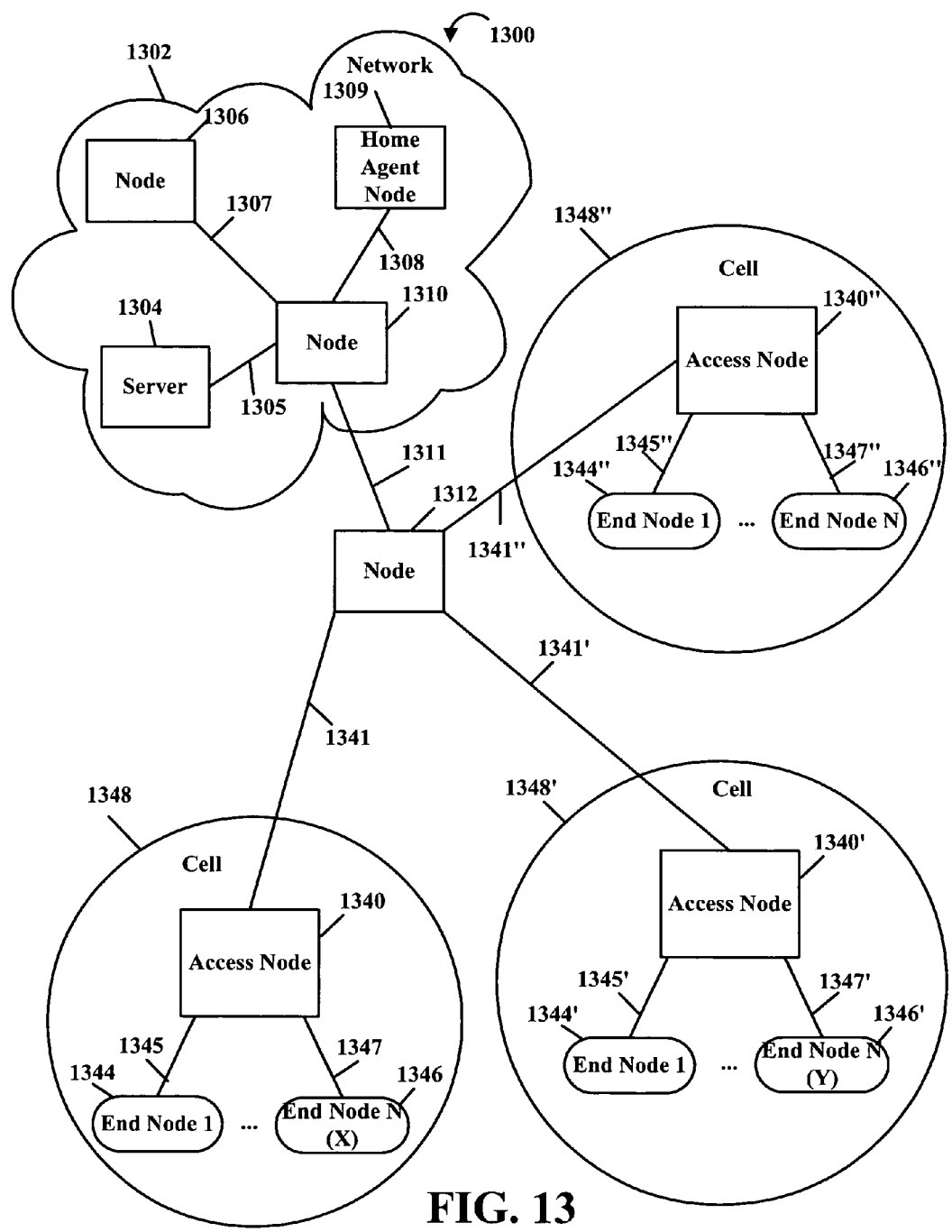
FIG. 13 is an illustration of an exemplary communication system (e.g., a cellular communication network) implemented in accordance with various aspects.

With reference to FIG. 13, illustrated is an exemplary communication system 1300 (e.g., a cellular communication network) implemented in accordance with various aspects, which comprises a plurality of nodes interconnected by communications links. Nodes in exemplary communication system 1300 exchange information using signals (e.g., messages) based on communication protocols (e.g., the Internet Protocol (IP)). The communications links of system 1300 may be implemented, for example, using wires, fiber optic cables, and/or wireless communications techniques. Exemplary communication system 1300 includes a plurality of end nodes 1344, 1346, 1344', 1346', 1344", 1346", which access communication system 1300 via a plurality of access nodes 1340, 1340', and 1340". End nodes 1344, 1346, 1344', 1346', 1344", 1346" may be, e.g., wireless communication devices or terminals, and access nodes 1340, 1340', 1340" may be, e.g., wireless access routers or base stations. Exemplary communication system 1300 also includes a number of other nodes 1304, 1306, 1309, 1310, and 1312, used to provide interconnectivity or to provide specific services or functions. Specifically, exemplary communication system 1300 includes a Server 1304 used to support transfer and storage of state pertaining to end nodes. The Server node 1304 may be an AAA server, a Context Transfer Server, a server including both AAA server functionality and Context Transfer server functionality.

Exemplary communication system 1300 depicts a network 1302 that includes Server 1304, node 1306 and a home agent node 1309, which are connected to an intermediate network node 1310 by corresponding network links 1305, 1307 and 1308, respectively. Intermediate network node 1310 in network 1302 also provides interconnectivity to network nodes that are external from the perspective of network 1302 via network link 1311. Network link 1311 is connected to another intermediate network node 1312, which provides further connectivity to a plurality of access nodes 1340, 1340', 1340" via network links 1341, 1341', 1341", respectively.

Each access node 1340, 1340', 1340" is depicted as providing connectivity to a plurality of N end nodes (1344, 1346), (1344', 1346'), (1344", 1346"), respectively, via corresponding access links (1345, 1347), (1345', 1347'), (1345", 1347"), respectively. In exemplary communication system 1300, each access node 1340, 1340', 1340" is depicted as using wireless technology (e.g., wireless access links) to provide access. A radio coverage area (e.g., communications cells 1348, 1348', and 1348") of each access node 1340, 1340', 1340", respectively, is illustrated as a circle surrounding the corresponding access node.

Exemplary communication system 1300 is presented as a basis for the description of various aspects set forth herein. Further, various disparate network topologies are intended to fall within the scope of the claimed subject matter, where the number and type of network nodes, the number and type of access nodes, the number and type of end nodes, the number and type of Servers and other Agents, the number and type of links, and the interconnectivity between nodes may differ from that of exemplary communication system 1300 depicted in FIG. 13. Additionally, functional entities depicted in exemplary communication system 100 may be omitted or combined. Also, the location or placement of the functional entities in the network may be varied.

Figure 14:
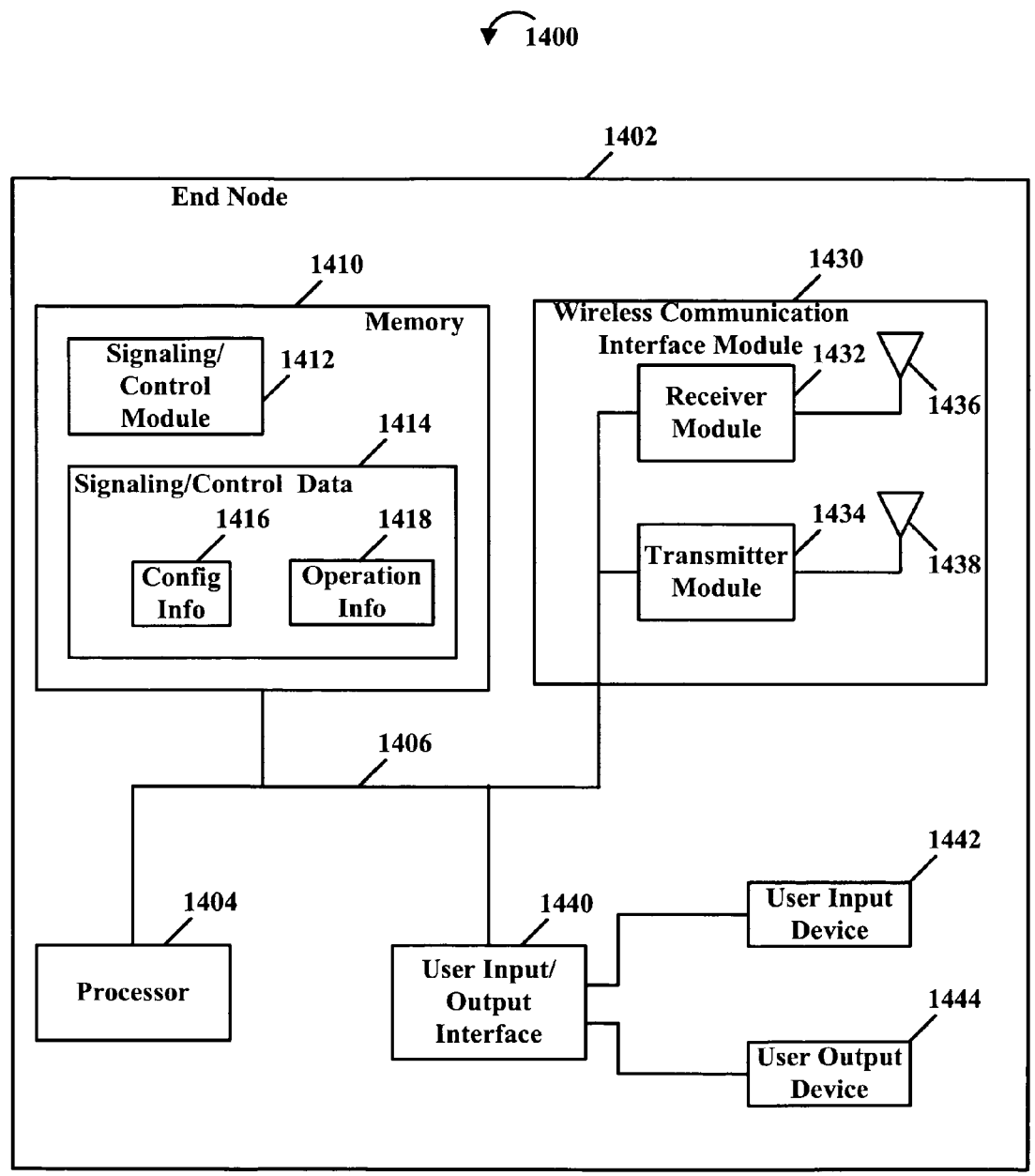
FIG. 14 is an illustration of an exemplary end node (e.g., a mobile node) associated with various aspects.

FIG. 14 illustrates an exemplary end node 1400 (e.g., a mobile node, a wireless terminal, etc.) associated with various aspects. Exemplary end node 1400 may be an apparatus that may be used as any one of the end nodes 1344, 1346, 1344', 1346', 1344", 1346" depicted in FIG. 13. As depicted, end node 1400 includes a processor 1404, a wireless communication interface 1430, a user input/output interface 1440 and memory 1410 coupled together by a bus 1406. Accordingly, various components of end node 1400 can exchange information, signals and data via bus 1406. Components 1404, 1406, 1410, 1430, 1440 of end node 1400 may be located inside a housing 1402.

Wireless communication interface 1430 provides a mechanism by which the internal components of the end node 1400 can send and receive signals to/from external devices and network nodes (e.g., access nodes). Wireless communication interface 1430 includes, for example, a receiver module 1432 with a corresponding receiving antenna 1436 and a transmitter module 1434 with a corresponding transmitting antenna 1438 used for coupling end node 1400 to other network nodes (e.g., via wireless communications channels).

Exemplary end node 1400 also includes a user input device 1442 (e.g., keypad) and a user output device 1444 (e.g., display), which are coupled to bus 1406 via user input/output interface 1440. Thus, user input device 1442 and user output device 1444 can exchange information, signals and data with other components of end node 1400 via user input/output interface 1440 and bus 1406. User input/output interface 1440 and associated devices (e.g., user input device 1442, user output device 1444) provide a mechanism by which a user can operate end node 1400 to accomplish various tasks. In particular, user input device 1442 and user output device 1444 provide functionality that allows a user to control end node 1400 and applications (e.g., modules, programs, routines, functions, etc.) that execute in memory 1410 of end node 1400.

Processor 1404 may be under control of various modules (e.g., routines) included in memory 1410 and may control operation of end node 1400 to perform various signaling and processing as described herein. The modules included in memory 1410 are executed on startup or as called by other modules. Modules may exchange data, information, and signals when executed. Modules may also share data and information when executed. Memory 1410 of end node 1400 may include a signaling/control module 1412 and signaling/control data 1414.

Signaling/control module 1412 controls processing relating to receiving and sending signals (e.g., messages) for management of state information storage, retrieval, and processing. Signaling/control data 1414 includes state information such as, for instance, parameters, status, and/or other information relating to operation of the end node. In particular, signaling/control data 1414 may include configuration information 1416 (e.g., end node identification information) and operational information 1418 (e.g., information about current processing state, status of pending responses, etc.). Signaling/control module 1412 may access and/or modify signaling/control data 1414 (e.g., update configuration information 1416 and/or operational information 1418).

Memory 1410 of end node 1400 may further include a detector module 1446, a requester module 1448, and/or a link establisher module 1450. Additionally, although not depicted, it is to be appreciated that detector module 1446, requester module 1448, and/or link establisher module 1450 may store and/or retrieve associated data that may be retained in memory 1410. Detector module 1446 may be utilized to detect signal(s) emanating from base station sectors. Further, requester module 1448 may enable a handoff request to be transmitted to a base station sector via a link associated with a disparate base station sector. Also, link establisher module 1450 may enable establishing a link with base station sector (s) based upon information received in response to the handoff requests sent by requester module 1448.

Figure 15:
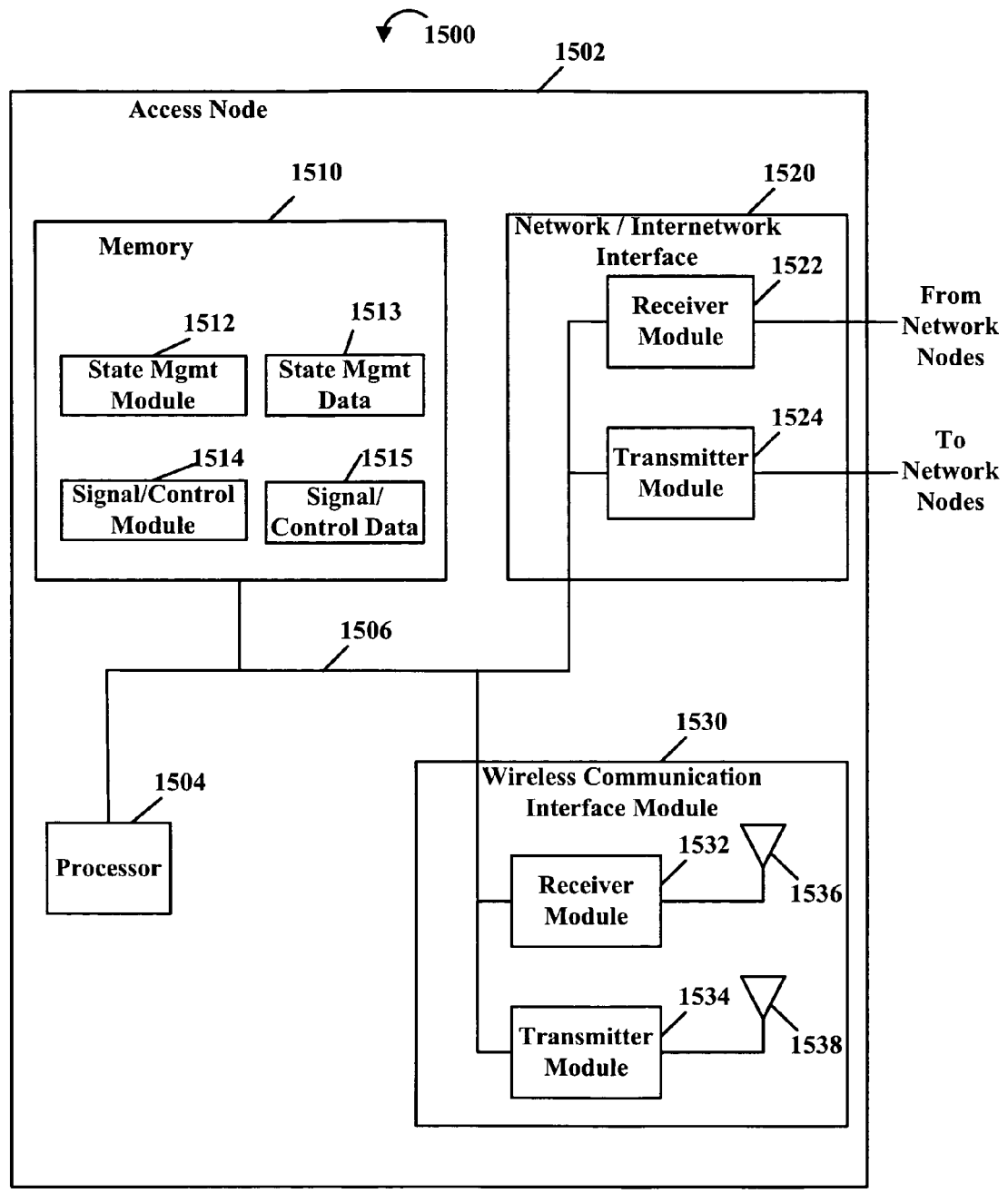
FIG. 15 is an illustration of an exemplary access node implemented in accordance with various aspects described herein.

FIG. 15 provides an illustration of an exemplary access node 1500 implemented in accordance with various aspects described herein. Exemplary access node 1500 may be an apparatus utilized as any one of access nodes 1340, 1340', 1340" depicted in FIG. 13. Access node 1500 includes a processor 1504, memory 1510, a network/internetwork interface 1520 and a wireless communication interface 1530, coupled together by a bus 1506. Accordingly, various components of access node 1500 can exchange information, signals and data via bus 1506. The components 1504, 1506, 1510, 1520, 1530 of the access node 1500 may be located inside a housing 1502.

Network/internetwork interface 1520 provides a mechanism by which the internal components of access node 1500 can send and receive signals to/from external devices and network nodes. Network/internetwork interface 1520 includes a receiver module 1522 and a transmitter module 1524 used for coupling access node 1500 to other network nodes (e.g., via copper wires or fiber optic lines). Wireless communication interface 1530 also provides a mechanism by which the internal components of access node 1500 can send and receive signals to/from external devices and network nodes (e.g., end nodes). Wireless communication interface 1530 includes, for instance, a receiver module 1532 with a corresponding receiving antenna 1536 and a transmitter module 1534 with a corresponding transmitting antenna 1538. Wireless communication interface 1530 may be used for coupling access node 1500 to other network nodes (e.g., via wireless communication channels).

Processor 1504 under control of various modules (e.g., routines) included in memory 1510 controls operation of access node 1500 to perform various signaling and processing. The modules included in memory 1510 may be executed on startup or as called by other modules that may be present in memory 1510. Modules may exchange data, information, and signals when executed. Modules may also share data and information when executed. By way of example, memory 1510 of access node 1500 may include a State Management module 1512 and a Signaling/Control module 1514. Corresponding to each of these modules, memory 1510 also includes State Management data 1513 and the Signaling/Control data 1515.

State Management Module 1512 controls the processing of received signals from end nodes or other network nodes regarding state storage and retrieval. State Management Data 1513 includes, for instance, end-node related information such as the state or part of the state, or the location of the current end node state if stored in some other network node. State Management module 1512 may access and/or modify State Management data 1513.

Signaling/Control module 1514 controls the processing of signals to/from end nodes over wireless communication interface 1530 and to/from other network nodes over network/internetwork interface 1520 as necessary for other operations such as basic wireless function, network management, etc. Signaling/Control data 1515 includes, for example, end-node related data regarding wireless channel assignment for basic operation, and other network-related data such as the address of support/management servers, configuration information for basic network communications. Signaling/Control module 1514 may access and/or modify Signaling/Control data 1515.

Memory 1510 may additionally or alternatively include a resource allocation module 1540, a handoff response module 1542, a link establishment module 1544, and/or a routing module 1546. Although not depicted, it is to be appreciated that resource allocation module 1540, handoff response module 1542, link establishment module 1544, and/or routing module may store and/or retrieve data from that may be retained in memory 1510. Resource allocation module 1540 may enable allocating resources as described above to a wireless terminal (e.g., in response to a received handoff request). Handoff response module 1542 may facilitate transmitting a handoff response that includes identified information related to the allocated resources. Link establishment module 1544 may enable establishing a link with a wireless terminal. Further, routing module 1546 may allow for receiving data from a wireless terminal and routing it to an appropriate base station sector and/or receiving data from a base station sector and routing it to an appropriate wireless terminal.

Figure 16:
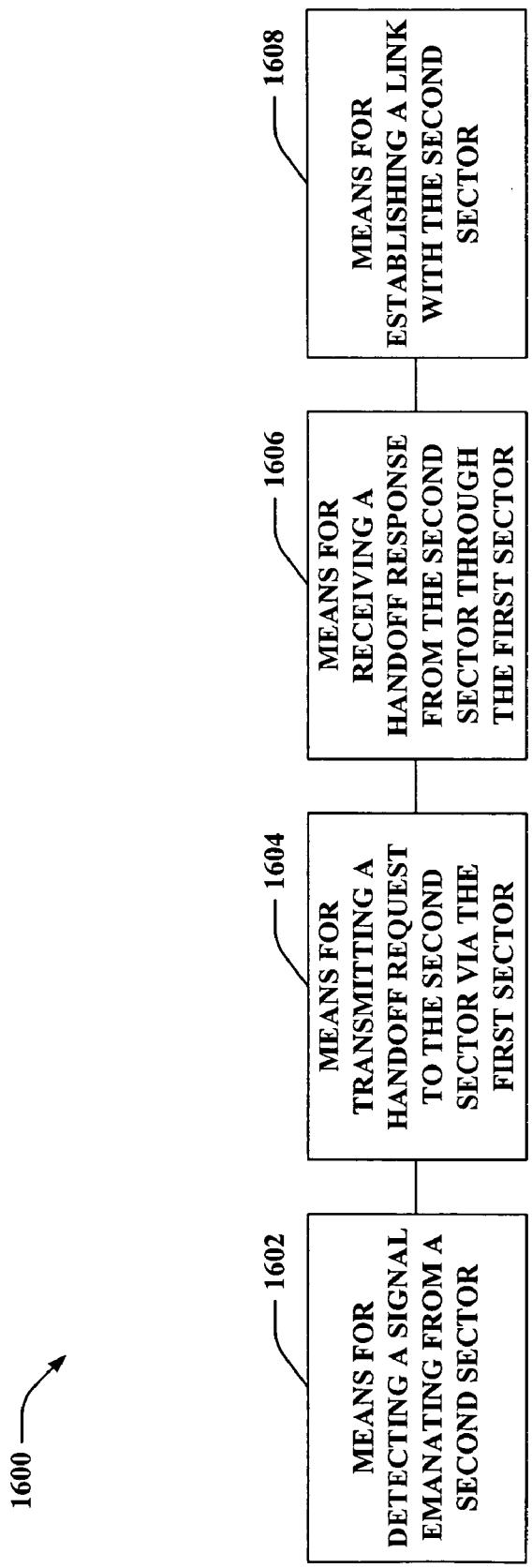
FIG. 16 is an illustration of a system that mitigates delay associated with handing off from a first sector to a second sector.

With reference to FIG. 16, illustrated is a system 1600 that mitigates delay associated with handing off from a first sector to a second sector. It is to be appreciated that system 1600 is represented as including functional blocks, which can be functional blocks that represent functions implemented by a processor, software, or combination thereof (e.g., firmware). System 1600 can be implemented in a wireless terminal and can include a logical module for detecting a signal emanating from a second sector 1602. For example, the signal may be a beacon, from which a signal quality measurement may be obtained. Further, system 1600 may comprise a logical module for transmitting a handoff request to the second sector via a first link with the first sector 1604. System 1600 may also include a logical module for receiving a handoff response from the second sector through the first link and the first sector 1606. According to an example, the handoff response may include identified information. The identified information may relate to resources allocated by the second sector and may include, for instance, an allocated access slot, timing related information, a session ON ID, an active ID, a destination MAC state, a time period during which an assigned ID (e.g., MAC ID, session ON ID, active ID, etc.) is valid, and the like. System 1600 may further comprise a logical module for establishing a second link with the second sector 1608. For example, the identified information associated with the handoff response may be utilized in connection with establishing such link.

Figure 17:
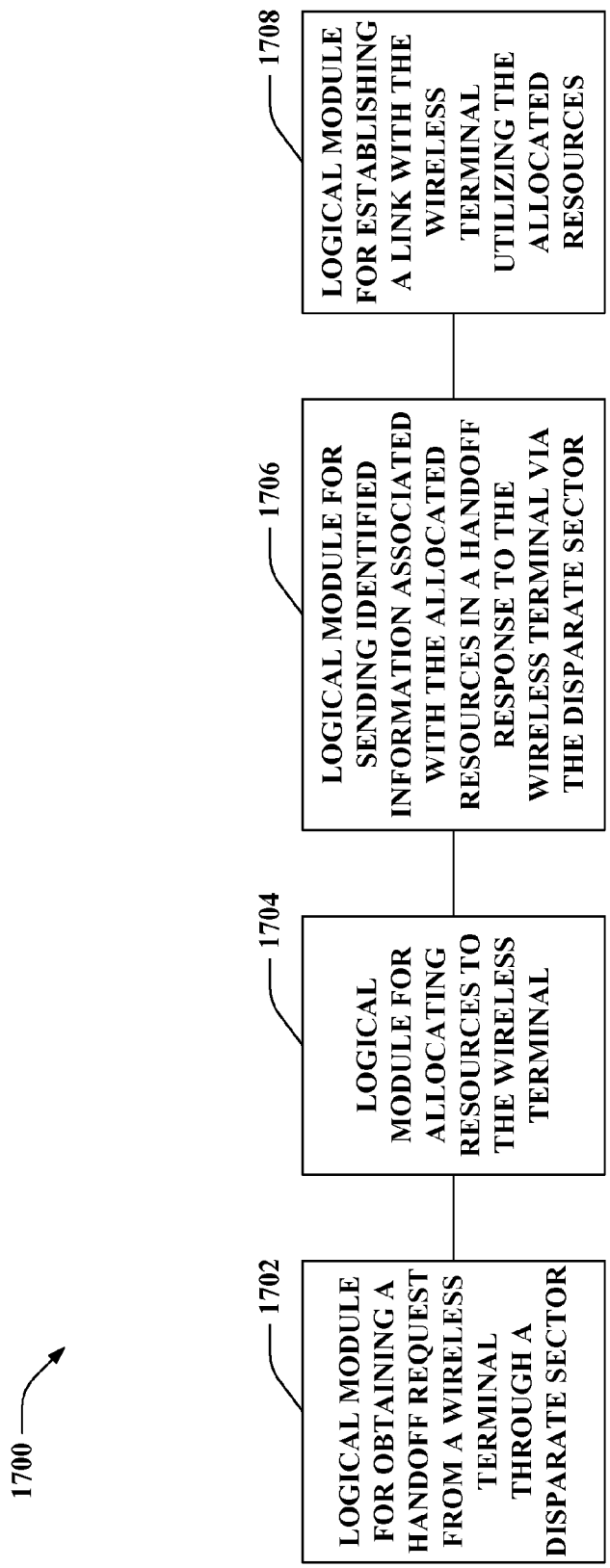
FIG. 17 is an illustration of a system that allocates resources to a wireless terminal for utilization in connection with a handoff.

Now turning to FIG. 17, illustrated is a system 1700 that allocates resources to a wireless terminal for utilization in connection with a handoff. System 1700 is represented as including functional blocks, which may represent functions implemented by a processor, software, or combination thereof (e.g., firmware). System 1700 may be implemented in a base station and may include a logical module for obtaining a handoff request from a wireless terminal through a disparate sector 1702. System 1700 may also comprise a logical module for allocating resources to the wireless terminal 1704. For instance, such allocation may be in response to the obtained handoff request. Further, system 1700 may include a logical module for sending identified information associated with the allocated resources in a handoff response to the wireless terminal via the disparate sector 1706. The identified information may include an allocated access slot, timing related information, a session ON ID, an active ID, a destination MAC state, and/or a time period during which an assigned ID is valid. System 1700 may additionally include a logical module for establishing a link with the wireless terminal utilizing the allocated resources 1708. For instance, the link may be established utilizing an allocated access slot in connection with physical layer access. According to a further illustration, the link may be established during a time period in which an assigned ID is valid; thus, authentication and/or encryption may be skipped.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of handing off from a first sector to a second sector, comprising:
    detecting a signal emanating from the second sector;
    deriving a connection identifier associated with the second sector based upon the detected signal;
    sending a handoff request that is received by the second sector, wherein the handoff request is sent via a first link with the first sector, wherein the handoff request comprises the derived connection identifier, and wherein the derived connection identifier identifies the second sector to the first sector;
    receiving a handoff response from the second sector through the first link and the first sector, wherein the handoff response includes identified information, wherein the identified information includes an index of an allocated access slot, wherein the allocated access slot is a portion of an access channel that is reserved for handoff, and wherein the handoff response indicates whether access request, access grant, and access exchange operations should be performed; and
    establishing a second link with the second sector utilizing the identified information.

2. The method of claim 1, wherein the identified information further comprises at least one of timing related information, a session ON ID, an active ID, a destination MAC state and a time period during which an assigned ID is valid.

3. The method of claim 1, further comprising:
    sending an access signal in the access slot to the second sector;
    receiving an access grant message from the second sector, the access grant message including at least a timing correction command;
    adjusting a transmitter symbol timing as a function of the timing correction command; and
    sending signals to the second sector using the transmitter symbol timing.

4. The method of claim 3, wherein the access slot is a dedicated access resource and cannot be used by a disparate access terminal.

5. The method of claim 3, further comprising:
    transmitting an uplink access exchange to the second sector;
    receiving a downlink access exchange from the second sector, wherein at least one of the uplink access exchange and the downlink access exchange conveys an identifier; and using the identifier in the second link.

6. The method of claim 1, wherein the identified information includes an identifier, the method further comprising using the identifier in the second link.

7. The method of claim 1, further comprising breaking the first link with the first sector prior to establishing the second link with the second sector.

8. The method of claim 1, further comprising:
    selecting a random access slot;
    sending an access signal in the random access slot to the second sector;
    receiving an access grant message from the second sector, the access grant message including at least a timing correction command;
    adjusting a transmitter symbol timing as a function of the timing correction command;
    sending an uplink access exchange to the second sector using the transmitter symbol timing, wherein the uplink access exchange conveys at least part of the identified information; and
    receiving a downlink access exchange from the second sector.

9. The method of claim 8, wherein the identified information includes a time period during which an assigned ID is valid, the random access slot being associated with a time prior to an end of the time period during which the assigned ID is valid.

10. The method of claim 1, further comprising:
    recording a transmitter symbol timing associated with the first link; and
    using the transmitter symbol timing in the second link.

11. A wireless communications apparatus, comprising:
    a memory that retains instructions for handing off from a first sector to a second sector; and
    a processor that detects a signal associated with a second sector, derives a connection identifier associated with the second sector based upon the detected signal, transmits a handoff request that is received by the second sector, wherein the handoff request is sent via a first link with the first sector, wherein the handoff request comprises the derived connection identifier, wherein the derived connection identifier identifies the second sector to the first sector, wherein the processor also receives a handoff response from the second sector via the first link and the first sector, and creates a second link with the second sector based upon identified information included in the handoff response, wherein the identified information includes an index of an allocated access slot, wherein the allocated access slot is a portion of an access channel that is reserved for handoff, and wherein the handoff response indicates whether access request, access grant, and access exchange operations should be performed.

12. The wireless communications apparatus of claim 11, wherein the identified information further comprises at least one of timing related information, a session ON ID, an active ID, a destination MAC state and a time period during which an assigned ID is valid.

13. The wireless communications apparatus of claim 11, wherein the processor further transmits an access signal in the allocated access slot to the second sector, receives an access grant message from the second sector including at least a timing correction command, alters a transmitter symbol timing base at least in part upon the timing correction command, and transmits signals to the second sector using the transmitter symbol timing.

14. A wireless communications apparatus for mitigating delay associated with handing off from a first sector to a second sector, comprising:
means for detecting a signal emanating from the second sector;
means for deriving a connection identifier associated with the second sector based upon the detected signal;
means for transmitting a handoff request that is received by the second sector, wherein the handoff request is sent via a first link with the first sector, wherein the handoff request comprises the derived connection identifier, and wherein the derived connection identifier identifies the second sector to the first sector;
means for receiving a handoff response from the second sector through the first link and the first sector, wherein the handoff response includes identified information, wherein the identified information includes an index of an allocated access slot, wherein the allocated access slot is a portion of an access channel that is reserved for handoff, and wherein the handoff response indicates whether access request, access grant, and access exchange operations should be performed; and
means for establishing a second link with the second sector.

15. The wireless communications apparatus of claim 14, further comprising:
means for establishing the second link with the second sector with a contention-free access.

16. The wireless communications apparatus of claim 14, wherein the identified information further comprises at least one of timing related information, a session ON ID, an active ID, a destination MAC state and a time period during which an assigned ID is valid.

17. The wireless communications apparatus of claim 14, further comprising:
means for transmitting an access signal in the allocated access slot to the second sector;
means for obtaining an access grant message from the second sector, the access grant message includes at least a timing correction command;
means for adjusting a transmitter symbol timing as a function of the timing correction command; and
means for transmitting signals to the second sector using the transmitter symbol timing.

18. A non-transitory machine-readable medium having stored thereon machine-executable instructions for:
receiving a beacon associated with a second sector;
deriving a connection identifier associated with the second sector based upon the received beacon;
transmitting a handoff request that is received by the second sector, wherein the handoff request is routed through a first link with a first sector, wherein the handoff request comprises the derived connection identifier, and wherein the derived connection identifier identifies the second sector to the first sector;
obtaining a handoff response from the second sector routed through the first link and the first sector, wherein the handoff response includes identified information, wherein the identified information includes an index of an allocated access slot, wherein the allocated access slot is a portion of an access channel that is reserved for handoff, and wherein the handoff response indicates whether access request, access grant, and access exchange operations should be performed; and
creating a second link with the second sector by utilizing the identified information.

19. The machine-readable medium of claim 18, wherein the identified information further comprises at least one of timing related information, a session ON ID, an active ID, a destination MAC state and a time period during which an assigned ID is valid.

20. The machine-readable medium of claim 19, wherein the allocated access slot is a dedicated access resource and disparate wireless terminals are inhibited from utilizing the allocated access slot.

21. A processor that executes the following instructions:
detecting a signal related to a second sector;
deriving a connection identifier associated with the second sector based upon the detected signal;
sending an expedited handoff request that is received by the second sector, wherein the handoff request is sent via a first link with a first sector, wherein the handoff request comprises the derived connection identifier, and wherein the derived connection identifier identifies the second sector to the first sector;
receiving a handoff response that includes identified information from the second sector via the first link and the first sector, wherein the identified information includes an index of an allocated access slot, wherein the allocated access slot is a portion of an access channel that is reserved for handoff, and wherein the handoff response indicates whether access request, access grant, and access exchange operations should be performed; and
establishing a second link with the second sector utilizing the identified information.

22. The processor of claim 21 that further executes the following instructions:
transmitting an access request in the access slot to the second sector;
receiving an access grant from the second sector, the access grant including at least a timing correction command;
modifying a transmitter symbol timing based at least in part upon the timing correction command; and sending signals to the second sector using the transmitter symbol timing.

23. The processor of claim 21, wherein the identified information further comprises at least one of timing related information, a session ON ID, an active ID, a destination MAC state and a time period during which an assigned ID is valid.

24. A method that facilitates allocating resources to a wireless terminal to mitigate handoff delay, comprising:
receiving, by a second sector, a handoff request from a wireless terminal via a first sector, wherein the handoff request comprises a connection identifier that identifies the second sector to the first sector;
allocating resources to the wireless terminal;
transmitting a handoff response that includes identified information related to the allocated resources, wherein the identified information includes an index of an allocated access slot, wherein the allocated access slot is a portion of an access channel that is reserved for handoff, and wherein the handoff response indicates whether access request, access grant, and access exchange operations should be performed; and
establishing a link with the wireless terminal by employing the allocated resources.

25. The method of claim 24, wherein the identified information further comprises at least one of timing related information, a session ON ID, an active ID, a destination MAC state and a time period during which an assigned ID is valid.

26. The method of claim 24, wherein establishing the link with the wireless terminal further comprises:
receiving an access request message in the allocated access slot from the wireless terminal;
transmitting an access grant message to the wireless terminal that includes at least a timing correction command; and
receiving signals from the wireless terminal adjusted based upon the timing correction command.

27. The method of claim 26, wherein the allocated access slot is dedicated to the wireless terminal.

28. The method of claim 26, further comprising:
receiving an uplink access exchange from the wireless terminal; and
transmitting a downlink access exchange to the wireless terminal, wherein at least one of the uplink access exchange and the downlink access exchange includes an identifier.

29. The method of claim 24, further comprising synchronizing the wireless terminal while establishing the link.

30. The method of claim 24, further comprising:
receiving an access signal in a random access slot;
transmitting an access grant message to the wireless terminal, the access grant message includes at least a timing correction command;
receiving an uplink access exchange from the wireless terminal, the uplink access exchange being synchronized based upon the timing correction command and includes at least part of the identified information; and
transmitting a downlink access exchange to the wireless terminal.

31. The method of claim 30, wherein the random access slot is earlier than the allocated access slot.

32. A wireless communications apparatus comprising a first sector, comprising:
a memory that retains an identifier related to a wireless terminal; and
a processor that receives a handoff request from the wireless terminal, wherein the handoff request comprises a connection identifier that identifies a second sector to the first sector, wherein the processor incorporates the identifier related to the wireless terminal in the handoff request, routes the handoff request to the second sector, receives a handoff response from the second sector, and forwards the handoff response to the wireless terminal, and wherein the handoff response indicates whether access request, access grant, and access exchange operations should be performed.

33. The wireless communications apparatus of claim 32, wherein the processor routes the handoff request based at least in part upon the connection identifier.

34. A wireless communications apparatus for allocating resources to a wireless terminal for utilization in connection with a handoff, comprising:
means for obtaining, by a second sector, a handoff request from a wireless terminal through a first sector, wherein the handoff request comprises a connection identifier that identifies the second sector to the first sector;
means for allocating resources to the wireless terminal;
means for sending identified information associated with the allocated resources in a handoff response to the wireless terminal via the first sector, wherein the identified information includes an index of an allocated access slot, wherein the allocated access slot is a portion of an access channel that is reserved for handoff, and wherein the handoff response indicates whether access request, access grant, and access exchange operations should be performed; and
means for establishing a link with the wireless terminal utilizing the allocated resources.

35. The wireless communications apparatus of claim 34, further comprising:
means for receiving an access signal in the allocated access slot from the wireless terminal;
means for transmitting an access grant message to the wireless terminal, the access grant message including at least a timing correction command; and
means for receiving signals from the wireless terminal, the signals being modified based upon the timing correction command.

36. The wireless communications apparatus of claim 34, wherein the identified information further comprises at least one of timing related information, a session ON ID, an active ID, a destination MAC state and a time period during which an assigned ID is valid.

37. A non-transitory machine-readable medium having stored thereon machine-executable instructions for:
receiving, by a second sector, a handoff request in response to a beacon from a wireless terminal via a first sector, wherein the handoff request comprises a connection identifier that identifies the second sector to the first sector;
allocating resources to the wireless terminal;
transmitting identified information associated with the resources in a handoff response to the wireless terminal through the disparate sector, wherein the identified information includes an index of an allocated access slot, wherein the allocated access slot is a portion of an access channel that is reserved for handoff, and wherein the handoff response indicates whether access request, access grant, and access exchange operations should be performed; and
creating a link with the wireless terminal employing the resources.

38. The machine-readable medium of claim 37, wherein the identified information further comprises at least one of timing related information, a session ON ID, an active ID, a destination MAC state and a time period during which an assigned ID is valid.

39. The machine-readable medium of claim 38, wherein the allocated access slot is dedicated to the wireless terminal.

40. A processor for a first sector that executes the following instructions:
   receiving a handoff request for a second sector from a wireless terminal, wherein the handoff request comprises a connection identifier that identifies the second sector to the first sector;
   incorporating an identifier related to the wireless terminal in the handoff request;
   routing the handoff request to the second sector;
   receiving a handoff response for the wireless terminal from the second sector; and
   transmitting the handoff response to the wireless terminal, wherein the handoff response indicates whether access request, access grant, and access exchange operations should be performed.

41. The processor of claim 40 that further executes the following:
   routing the handoff request to the second sector based upon the connection identifier.

42. The processor of claim 40 that further executes the following:
   determining the identifier related to the wireless terminal.

* * * * *